(12) United States Patent
Aljallis et al.

(10) Patent No.: US 11,427,121 B2
(45) Date of Patent: Aug. 30, 2022

(54) VEHICLE FOR CONTAINER TRANSPORT

(71) Applicant: Walmart Apollo, LLC, Bentonville, AR (US)

(72) Inventors: Elias Aljallis, Howard Beach, NY (US); Jeremiah Bruno Miele, Pittsburgh, PA (US); Vikranth Gopalakrishnan, North Brunswick, NJ (US); Walter Gunter, Jr., Murray, UT (US); Brooke Anne Benham, Bartow, FL (US); Ryan Christopher Greenhill, Cornwall-on-Hudson, NY (US); Haaris Hemani, Ontario, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 497 days.

(21) Appl. No.: 16/669,811

(22) Filed: Oct. 31, 2019

(65) Prior Publication Data

US 2020/0215955 A1 Jul. 9, 2020

Related U.S. Application Data

(60) Provisional application No. 62/789,420, filed on Jan. 7, 2019.

(51) Int. Cl.
*B60P 3/00* (2006.01)
*B60Q 1/04* (2006.01)
(Continued)

(52) U.S. Cl.
CPC ............... *B60P 3/007* (2013.01); *B60Q 1/04* (2013.01); *B62B 3/005* (2013.01); *B62B 3/02* (2013.01); *B62B 5/00* (2013.01); *B62B 5/0033* (2013.01); *B62B 5/0069* (2013.01); *B60B 19/003* (2013.01); *B60Q 2400/50* (2013.01); *B62B 2202/12* (2013.01); *B62B 2206/003* (2013.01); *B62B 2301/25* (2013.01); *G05D 1/0212* (2013.01); *G05D 2201/0216* (2013.01)

(58) Field of Classification Search
CPC ....... B60P 3/007; B60Q 1/04; B60Q 2400/50; B62B 3/005; B62B 3/02; B62B 5/00; B62B 5/0033; B62B 5/0069; B62B 2202/12; B62B 2206/003; B62B 2301/25; B60B 19/003; G05D 1/0212; G05D 2201/0216

See application file for complete search history.

(56) References Cited

U.S. PATENT DOCUMENTS 10,099,864 B1 10/2018 Gopalakrishnan et al.
10,373,097 B2 8/2019 Kulkarni et al.
(Continued)

*Primary Examiner* — John D Walters
(74) *Attorney, Agent, or Firm* — Duane Morris LLP; Manita Rawat

(57) ABSTRACT

A vehicle can include a base assembly, a rack assembly, and a processing system. The base assembly can include a platform, a plurality of wheels, and a motor for driving at least one of the plurality of wheels. The rack assembly can include a storage shelf connected to the base assembly through a coupling, which includes a bearing assembly enabling the storage shelf to rotate with respect to the platform. The processing system can be configured to communicatively couple with the rack assembly and include one or more processors configured to: determine a location of a target good; cause the storage shelf to move based on the determined location.

20 Claims, 22 Drawing Sheets

(51) Int. Cl.
*B62B 3/02* (2006.01)
*G05D 1/02* (2020.01)
*B62B 5/00* (2006.01)
*B62B 3/00* (2006.01)
*B60B 19/00* (2006.01)

(56) References Cited

U.S. PATENT DOCUMENTS

| | | | |
|---|---|---|---|
| 10,513,394 B2 * | 12/2019 | Borders | B65G 67/22 |
| 10,803,420 B2 * | 10/2020 | Jarvis | G05D 1/0274 |
| 10,894,664 B1 * | 1/2021 | Brady | B65G 1/1378 |
| 11,167,924 B2 * | 11/2021 | Borders | B65G 67/22 |
| 11,203,118 B1 * | 12/2021 | McDowall | B25J 9/0084 |
| 2007/0100496 A1 * | 5/2007 | Forell | G05D 1/024 |
| | | | 701/23 |
| 2018/0096299 A1 | 4/2018 | Jarvis et al. | |
| 2018/0127211 A1 | 5/2018 | Jarvis et al. | |
| 2018/0127212 A1 | 5/2018 | Jarvis et al. | |

* cited by examiner

VEHICLE FOR CONTAINER TRANSPORT

CROSS REFERENCE TO RELATED APPLICATIONS

This application claims priority to U.S. Provisional Patent Application No. 62/789,420 entitled "Vehicle for Container Transport," filed Jan. 7, 2019, which is hereby incorporated by reference in its entirety.

TECHNICAL FIELD

Among other things, the present application discloses vehicles for transporting goods. The vehicles can operate within an order fulfillment and distribution facility.

BACKGROUND

Warehouses can store many different kinds of items to fulfill remote orders. When a customer places a remote order (e.g., an online order), a provider can load the ordered items from warehouse shelves into containers located on a cart. Non-motorized carts can become cumbersome to move once fully loaded. Therefore, some providers may prefer motorized carts (i.e., vehicles).

SUMMARY

A vehicle can include a base assembly, a rack assembly, and a processing system. The base assembly can include a platform, a plurality of wheels and a motor for driving at least one of the plurality of wheels. The rack assembly can include a storage shelf connected to the base assembly through a coupling, which includes a bearing assembly enabling the storage shelf to rotate with respect to the platform. The processing system can be configured to communicatively couple with the rack assembly and include one or more processors configured to: determine a location of a target good; cause the storage shelf to move based on the determined location.

A vehicle can include a base assembly, a rack assembly, and a processing system. The base assembly can include a platform, a plurality of wheels and a motor for driving at least one of the plurality of wheels. The rack assembly can include a storage shelf connected to the base assembly through a coupling assembly, which can include a bearing assembly enabling the storage shelf to rotate with respect to the platform. The processing system can be configured to communicatively couple with the rack assembly and include one or more processors configured to: determine at least one dimension of an item to be loaded onto the storage shelf; cause the storage shelf to move based on the at least one determined dimension.

A vehicle can include a base assembly, a rack assembly, and a processing system. The base assembly can include a platform, a plurality of wheels and a motor for driving at least one of the plurality of wheels. The rack assembly can include a storage shelf connected to the base assembly through a coupling assembly, which can include a bearing assembly enabling the storage shelf to rotate with respect to the platform. The processing system can be configured to communicatively couple with the rack assembly and include one or more processors configured to: determine a location of a user; determine at least one dimension of an item to be loaded onto the storage shelf; and cause the storage shelf to rotate within the bearing assembly toward the determined user location at an angle based on the at least one determined item dimension.

A vehicle can include a base assembly, a rail assembly, and a rack assembly. The base assembly can include a platform, a plurality of Mecanum wheels and a motor for driving at least one of the plurality of Mecanum wheels. The rail assembly can include a beam defining a groove. The beam can be affixed to the base assembly. The rack assembly can include a storage shelf joined with an elevator coupling. The elevator coupling can be configured to translate within the groove and include a bearing assembly enabling the storage shelf to rotate with respect to the platform.

A vehicle can include a base assembly, an illumination assembly, and a processing system. The base assembly can include a platform, a plurality of wheels, and a motor for driving at least one of the plurality of wheels. The illumination assembly can be coupled to the platform and include a light projector configured to illuminate a floor on which the vehicle drives. The processing system configured to communicatively couple with the illumination assembly. The processing system can include one or more processors configured to: determine at least one route for the vehicle; instruct the light projector to produce and cast a graphic with a shape reflecting the determined vehicle route.

A vehicle can include a base assembly, a light projector, and a processing system. The base assembly can include a platform, a plurality of wheels, and a motor for driving at least one of the plurality of wheels. The light projector can be mounted to the base assembly. The processing system configured to communicatively couple with the light projector. The processing system can include one or more processors configured to: determine a location of a target good; cause the light projector to cast a graphic identifying the determined item location.

BRIEF DESCRIPTION OF THE FIGURES

The Figures show some of the illustrative embodiments disclosed herein. As further explained below, the claimed inventions are not limited to the illustrative embodiments and therefore are not limited to the embodiments shown in the Figures. For clarity and ease of reading, some Figures omit views of certain features. The relative dimensions shown in the Figures can serve as original support for some illustrative embodiments. Other illustrative embodiments lack any dimensional relationship to the Figures. Therefore, the claimed inventions are not limited by or to any relative dimensions shown in the Figures unless explicitly stated otherwise.

The present disclosure generally uses the terms "longitudinal", "axial", "transverse", and "vertical" to give the reader context when viewing the Figures. Referring to the Figures, depth along the X-axis can be "transverse", depth along the Y-axis can be "longitudinal" or "axial", and depth along the Z-axis can be "vertical". The X, Y, and Z-axes are consistent across the Figures.

DETAILED DESCRIPTION

Figure 1:
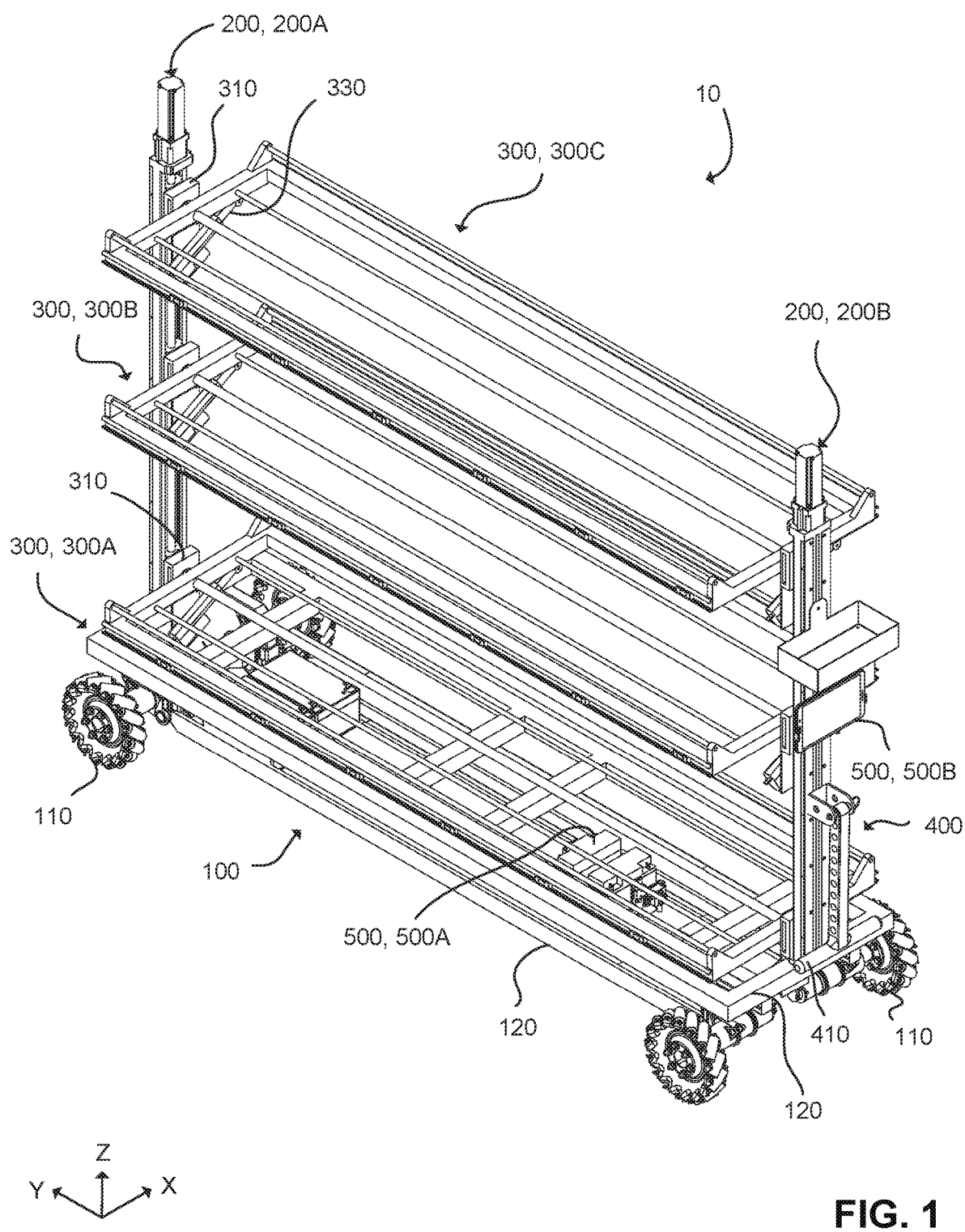
FIG. 1 is a front isometric view of a cart, in accordance with some embodiments.

While the features, methods, devices, and systems described herein may be embodied in various forms, there are shown in the drawings, and will hereinafter be described, some illustrative (i.e., example) embodiments. The claimed inventions are not limited to the illustrative embodiments. Therefore, some implementations of the claimed inventions will have different features than those set out in this disclosure. Further, implementations of the claimed inventions can make changes with respect to the claims without departing from the spirit or scope of the application. Therefore, the claimed inventions are intended to embrace their full-range of equivalents.

Unless otherwise indicated, any directions reflect the exemplary orientations shown in the corresponding drawings and do not limit the scope of the present disclosure. Any absolute term (e.g., large, small) can be replaced with a corresponding relative term (e.g., larger, smaller).

Figure 4:
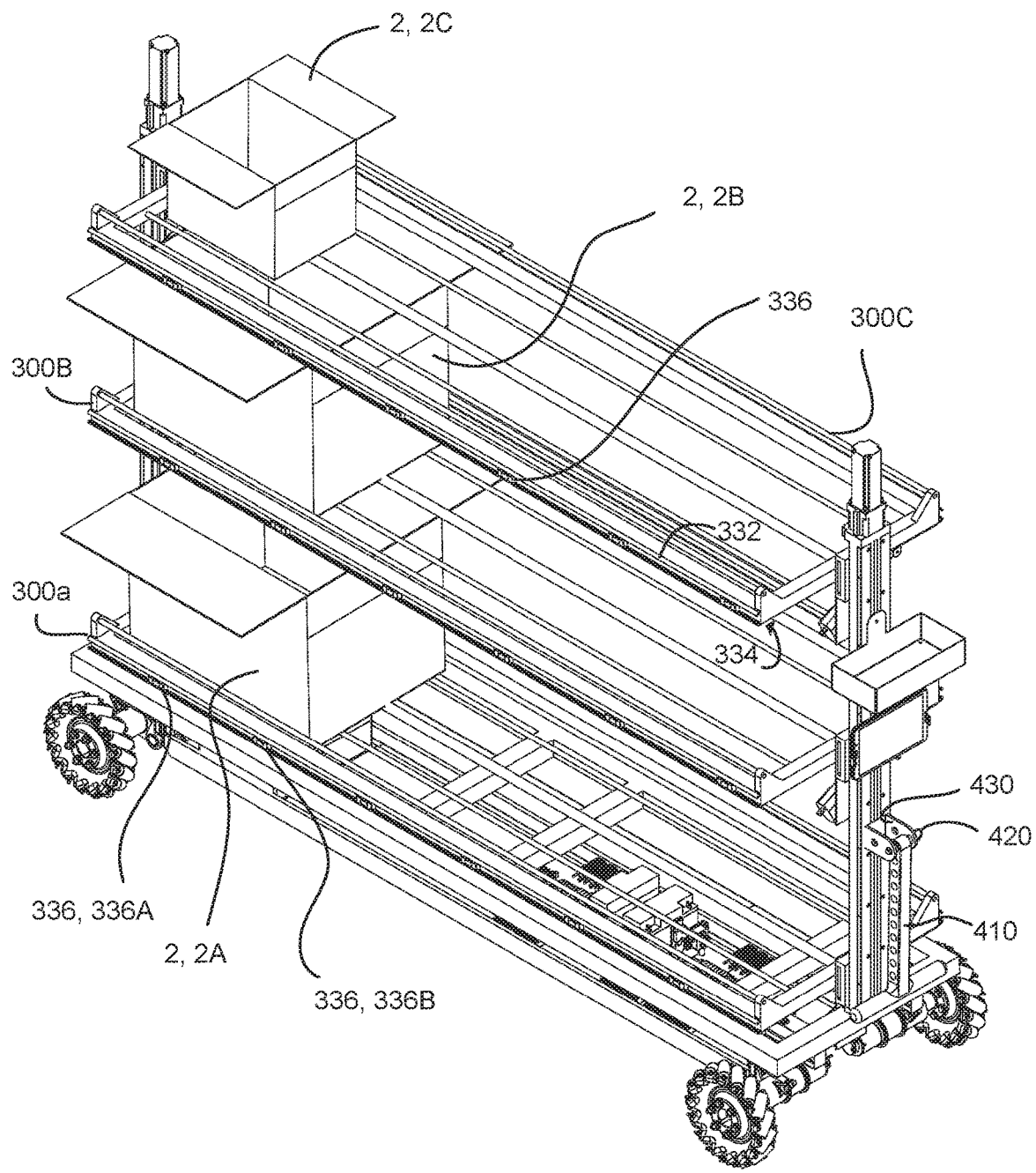
FIG. 4 is a front isometric view of the cart supporting three containers for carrying goods, in accordance with some embodiments.
Figure 5:
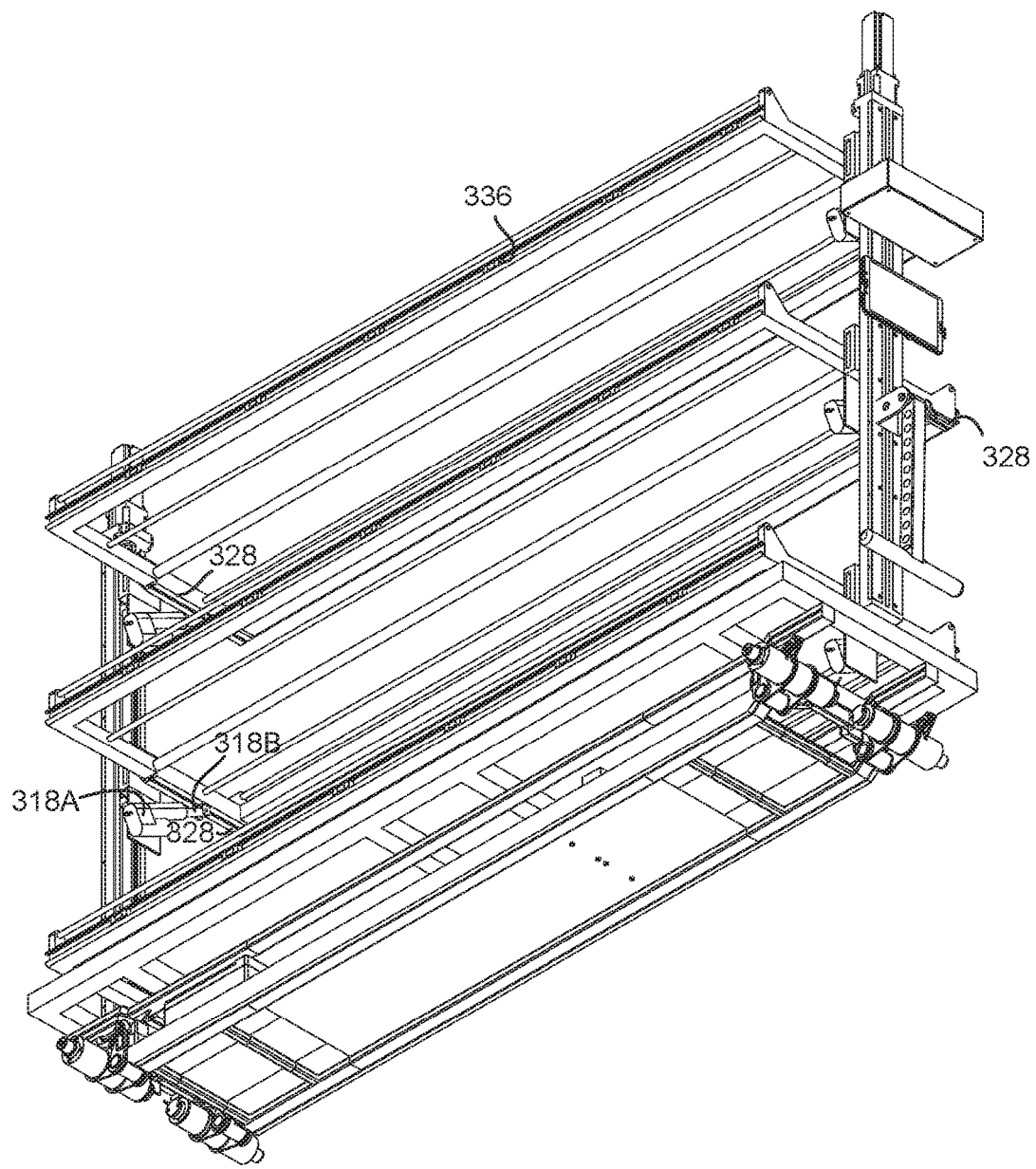
FIG. 5 is a lower front isometric view of the cart, in accordance with some embodiments. The wheels are omitted.

FIG. 1 is a front isometric view of a cart 10 (also called a vehicle). Cart 10 can include shelves for transporting containers 2 (as shown in FIG. 4) storing goods. Although the present application generally discusses cart 10 in the context of warehouse order fulfillment, the concepts disclosed herein can apply to any vehicle including, for example, a tractor, a truck, and a car.

Referring to FIG. 1, cart 10 can include a base assembly 100, one or more column assemblies 200 (also called beam, support, and rail assemblies), one or more rack assemblies 300, a lever assembly 400, and a processing system 500. Processing system 500 can be distributed across one or more components, such as a fixed component 500A and a mobile component 500B. Processing system 500 can be configured to automatically cause cart 10 to perform any of the operations (i.e., functions) disclosed herein.

Base assembly 100 can include a platform 120 to which one or more motors (e.g., electric motors and not shown) are mounted and from which one or more axles (not labeled) extend. Each axle can have an end terminating at a wheel 110 for moving cart 10 with respect to ground (also called floor and not shown).

Figure 6:
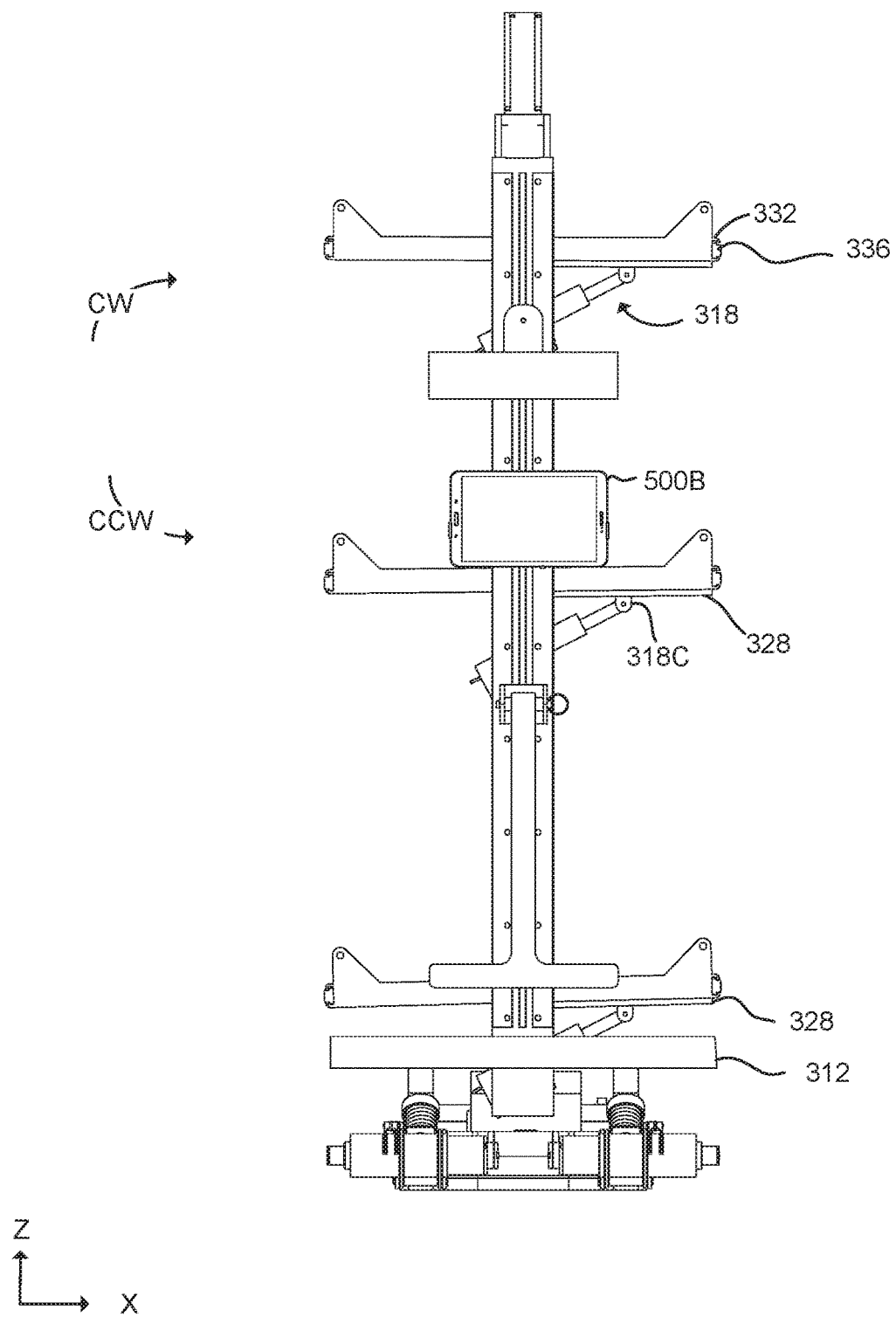
FIG. 6 is a front elevational view of the cart, in accordance with some embodiments. The wheels are omitted.

Base assembly 100 can include a steering system (not shown) for directing the axels and a suspension system (not labeled but partially shown in FIG. 6). As shown in FIG. 1, wheels 110 can be Mecanum wheels. As a result, cart 10 can be configured to perform a zero radius 360° turn. Further, the Mecanum wheels 110 can configure cart 10 to move, without turning, in a plurality of directions including forward, backward, right, and left (respectively meaning the +Y, −Y, +X, and −X directions). Although not shown, wheels 110 can be traditional with ordinary tires such that cart 10 is primarily configured to move along the longitudinal axis.

The one or more motors can be configured to directly power one or more (e.g., all) of the wheels 110 and the steering system responsive to commands from processing system 500. Although not shown, base assembly 100 can include a longitudinally retractable plate configured to occupy an extended position where the plate is disposed beneath control lever 400 and a retracted position where the plate is hidden underneath base platform 120. A user of cart 10 can stand on the extended plate while cart 10 is in motion.

Column assemblies 200, including leading and trailing column assemblies 200A, 200B can be for mounting the one or more rack assemblies 300 to base assembly 100 and/or for enabling vertical translation of the one or more rack assemblies 300 with respect to base assembly 100. The terms leading and trailing are only used for convenience and do not necessarily reflect the movement capacity of cart 10, which can be configured to drive forwards and backwards along the Y-axis from the position shown in FIG. 1. Put differently, cart 10 can be configured to drive with leading column assembly 200A in a forward position or trailing column assembly 200B in the forward position.

Figure 7:
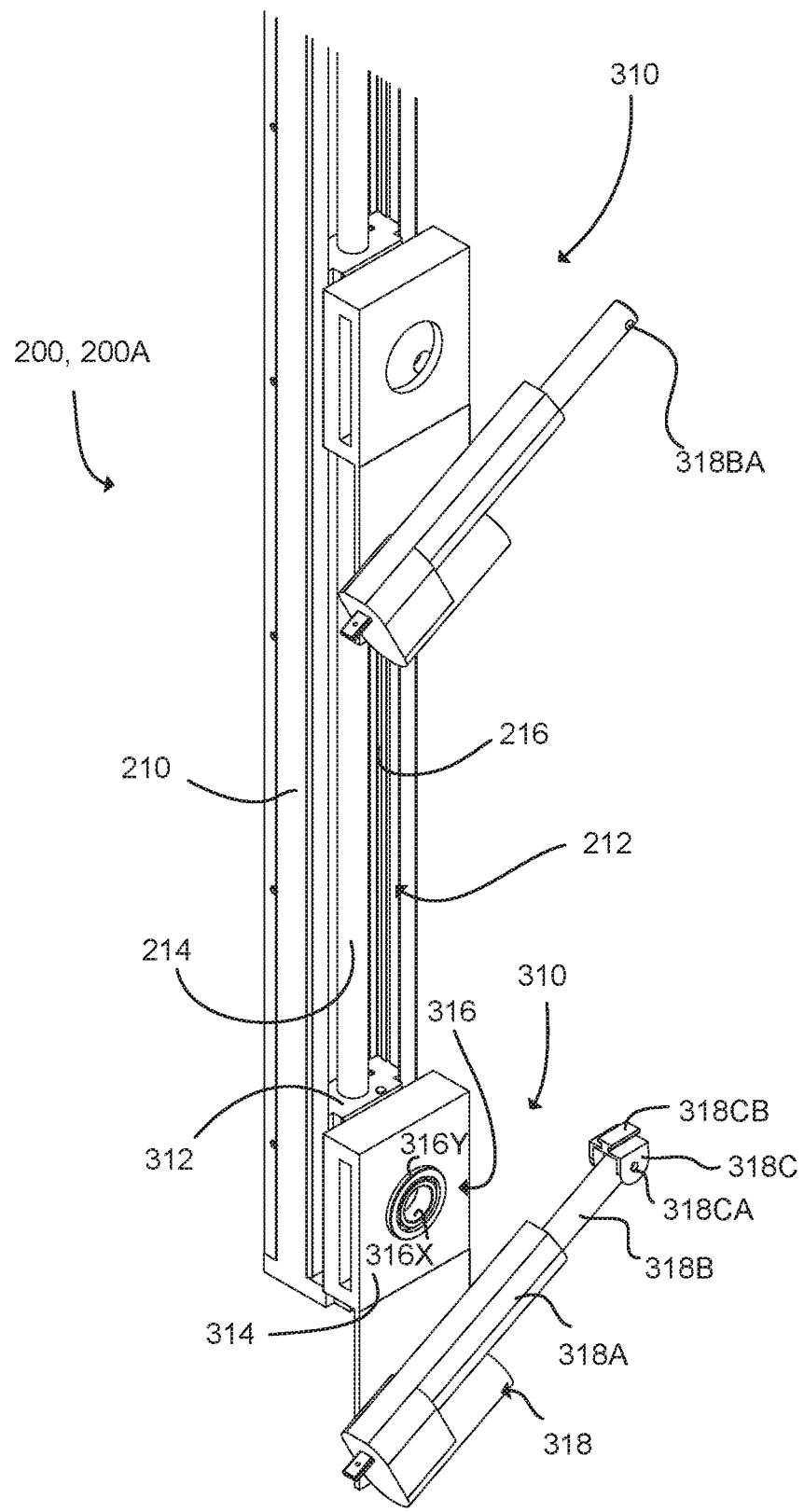
FIG. 7 is from the perspective of FIG. 1 and depicts, in isolation, a coupling assembly of the cart mounted to and within a riser, in accordance with some embodiments.

Referring to FIGS. 1 and 7, FIG. 7 being an enlarged and fragmentary view extracted from FIG. 1, each column assembly 200 can include a vertically extending beam 210 (also called a track) statically fastened (e.g., bolted and/or welded) to platform 120. Each beam 210 can define a vertically extending channel 212 for accommodating vertical translation of coupling assemblies 310 supporting rack assemblies 300.

A rod 214 can vertically extend through channel 212. Rod 214, along with vertically extending projections and recesses 216 defined in the walls of beam 210 surrounding channel 212 (which can engage reciprocal projections and recesses extending from channels 212), can serve as alignment features that discourage coupling assemblies 310 from escaping channels 212 and discourage coupling assemblies 310 from misaligning within channels 212.

Figure 2:
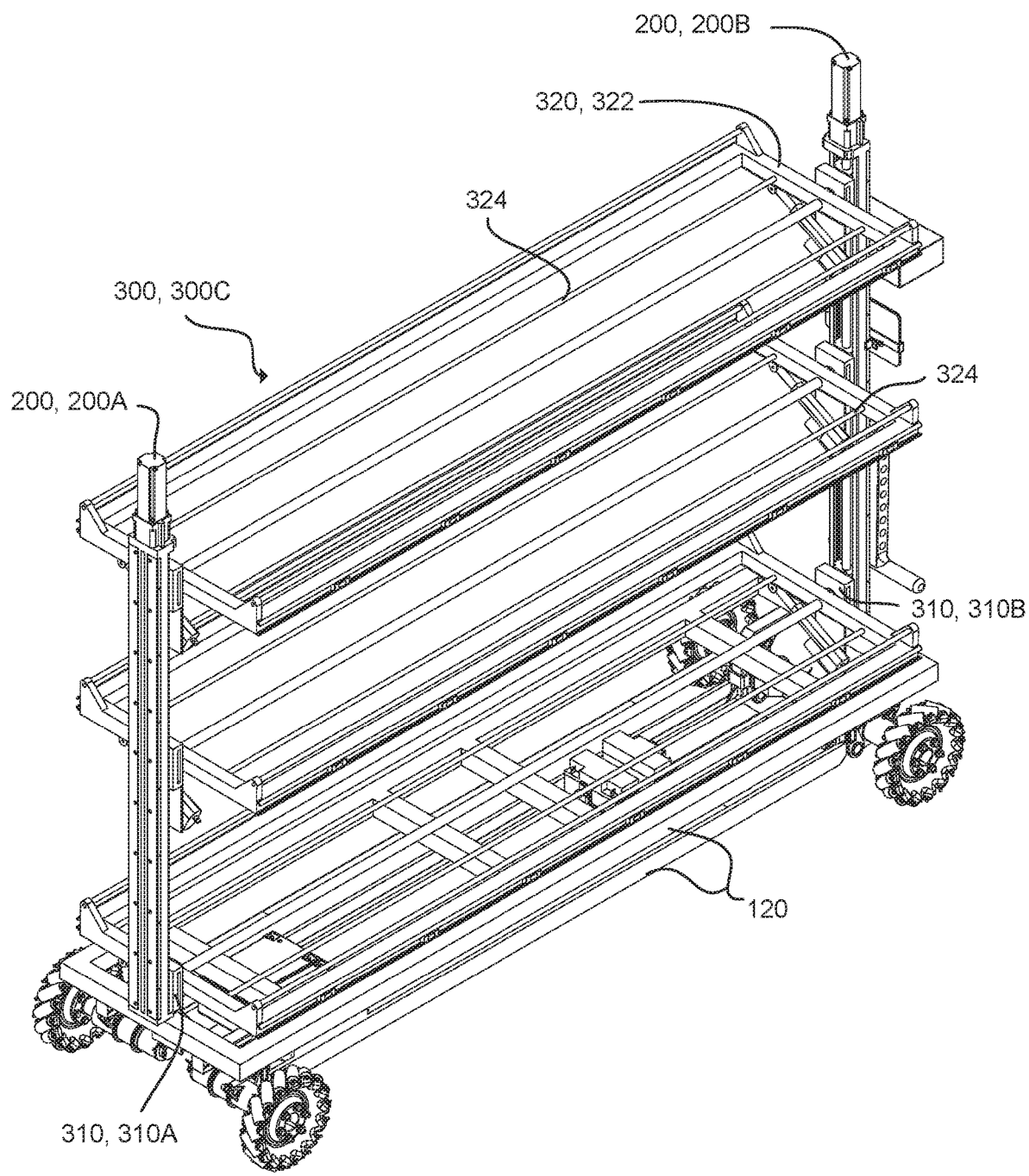
FIG. 2 is a rear isometric view of the cart, in accordance with some embodiments.

Referring to FIGS. 2 and 7, multiple rack assemblies 300 can be simultaneously mounted to base assembly 100 by virtue of opposing coupling assemblies 310 being both transversely and longitudinally confined within channels 212. In the depicted embodiment of cart 10, three rack assemblies 300 including lower, middle, and upper rack assemblies 300A, 300B, 300C are provided. Other embodiments of cart 10 can include fewer than three (e.g., zero or one) or more than three (e.g., four) rack assemblies 300.

Figure 8:
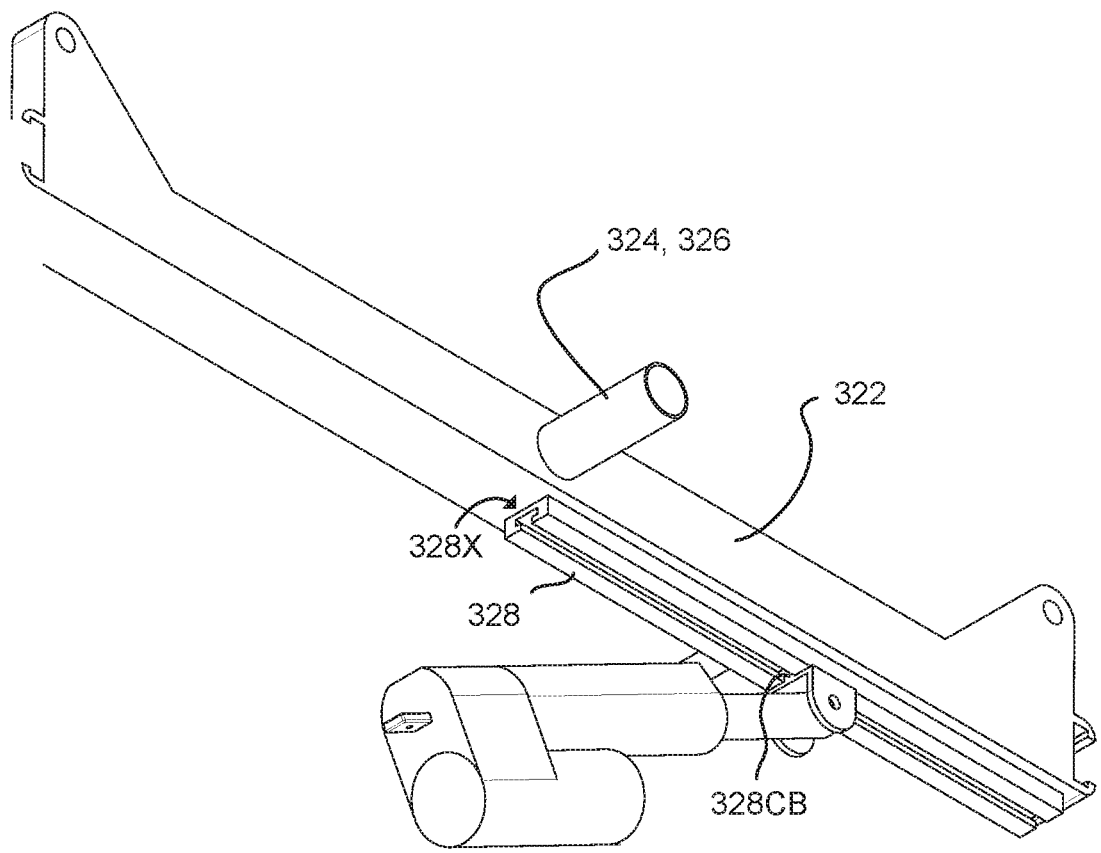
FIG. 8 is from the perspective of FIG. 9 and depicts, in isolation, an actuator assembly of the cart engaged with a track defined by a rack assembly of the cart, in accordance with some embodiments
Figure 9:
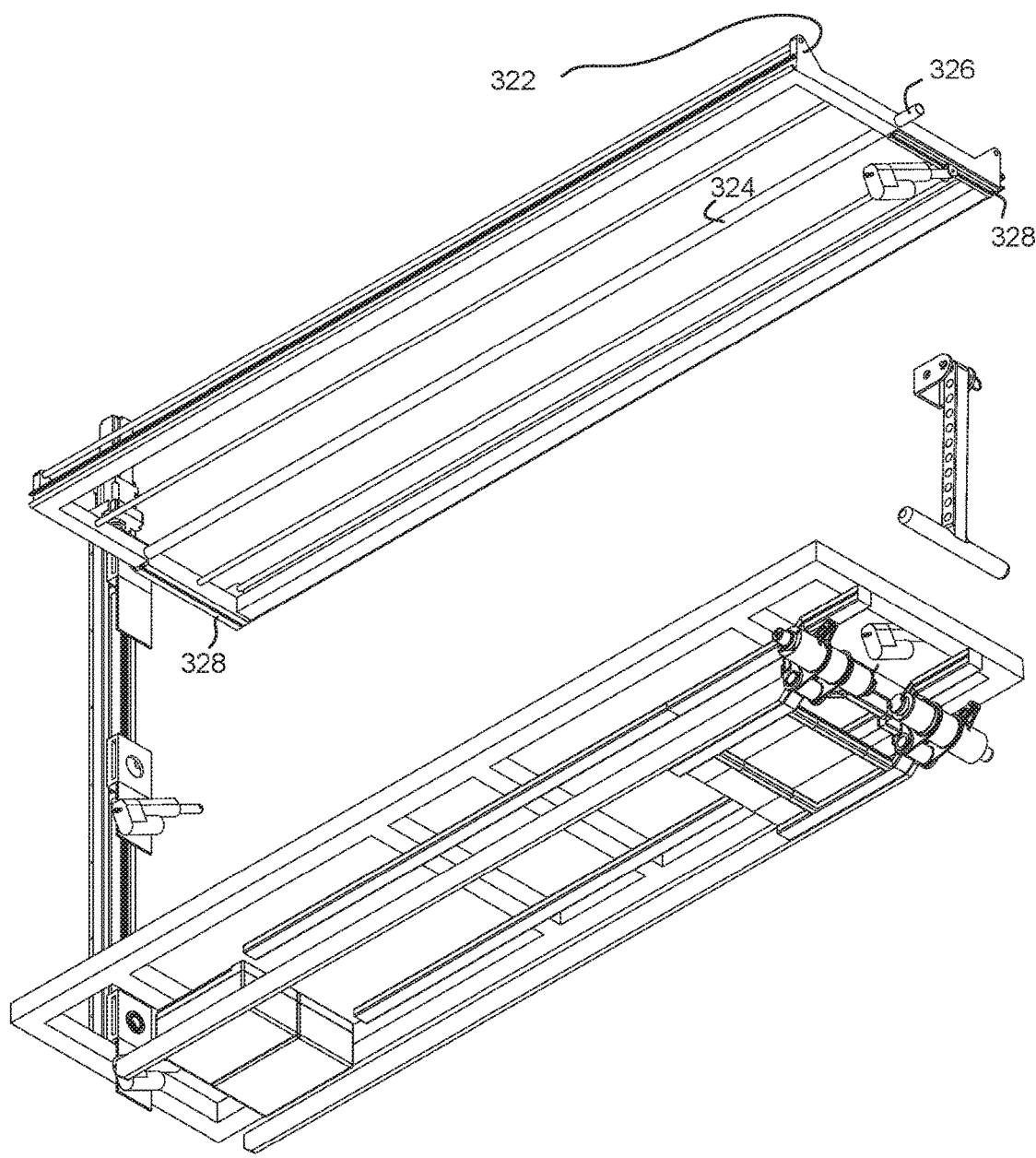
FIG. 9 is a lower front isometric view of the cart, in accordance with some embodiments. Various features are omitted.

Each rack assembly 300 can include a storage shelf 320 (also called a rack) disposed between the above-discussed opposing coupling assemblies 310. Each shelf 320 can include a peripheral platform 322 supporting one or more rods 324. As shown in FIG. 2, some rods 324 can be level with peripheral platform 322 while other rods 324 (specifically those at the outer transverse positions) can be raised above platform 322 to discourage transverse movement of containers 2 (FIG. 4) resting on storage shelves 320. Referring to FIGS. 8 and 9, and as further discussed below, a rail 328 (also called a plate) can be securely affixed under each longitudinal end of peripheral platform 322. Each rail 328 can define a channel 328X for receiving an actuator car 318C (discussed below).

As shown in FIGS. 8 and 9, at least one rod 324 per rack assembly 300 can be sized to extend through and protrude from both longitudinal ends of peripheral platform 322. Each resulting longitudinal protrusion 326 can fit within an inner bearing race of a coupling assembly 310. Therefore, the two opposing longitudinal protrusions 326 of a single rod 324 (the central rod in FIG. 9) can distribute the full weight of a storage shelf, including any containers 2 supported thereon, to opposing coupling assemblies 310 including a leading coupling assembly 310, 310B tracked within leading column assembly 200A and a trailing coupling assembly 310, 310B tracked within trailing column assembly 200B (labeled in FIGS. 2 and 3).

Referring to FIG. 7, each coupling assembly 310 can include an elevator 312 (also called a car), a flange 314 (also called a body), a bearing assembly 316, and an actuator assembly 318. Elevator 312 can be configured to vertically translate (i.e., slide) within channel 212. Elevator 312 can define a central cylindrical void (not labeled) through which rod 214 extends and include projections extending into the reciprocal grooves 216 defined by beam 212. Although not shown, elevator 312 can include an energizing element (e.g., an electric motor, a solenoid) connected to processing system 500 for vertical acceleration and a braking element (e.g., a solenoid, brake pads) for vertical deceleration. When rack assembly 300 is not vertically translating, the braking element can remain in an engaged state to discourage unwanted vertical motion. The opposing elevators 312 assigned to each rack assembly 300 can be configured to translate in-sync to keep the rack assembly 300 planar.

Flange 314 can be directly secured (e.g., welded, fastened, etc.) to elevator 312 and can define a central aperture (not labeled) for receiving bearing assembly 316. Bearing assembly 316 can be configured to enable rotation of storage shelf 320 about the longitudinal axis (i.e., the Y-axis) with respect to elevator 312 and flange 312. Bearing assembly 316 can include an inner race 316X, an outer race 316Y, and a plurality of roller elements (e.g., cylinders, ball bearings, etc.) disposed in the radial gap (not labeled) defined therebetween. Inner race 316X can securely affixed to longitudinal protrusion 326 of storage shelf 320. Outer race 316Y can be securely affixed to flange 314. Bearing assembly 316 is omitted from the upper coupling assembly 310 in FIG. 7.

As shown in FIGS. 7, 8, and 9, actuator 318 can be a linear actuator including a sleeve 318A, a piston 318B, and a car 318C. Sleeve 318A can be securely affixed (e.g., immobile with respect to) flange 314. Sleeve 318A can house a motor or other actuating element (not shown) connected to processing system 500 for extending and retracting piston 318B within the central bore defined through sleeve 318A. Car 318C can be pivotably attached to piston 318B about a pin (not shown) extending through a pair of apertures 318CA defined in car 318 and a matching bore 318BA defined in piston 318B. Car 318C can include a projection 318CB (also called a tooth, a flange, an extension, etc.). Referring to FIG. 8, each projection 318CB can be slotted within a reciprocally shaped channel 328X (also called slot or track) defined by rail 328.

Referring to FIGS. 6 and 8, extension of piston 318B can cause car 318C to slide within reciprocal channel 328X toward one end of rail 328, thus causing storage shelf 320 to rotate in a counter-clockwise direction (labeled CCW in FIG. 6) about the central axis of the rod 324 having projections 326 received in the opposing bearing assemblies 316. Retraction of piston 318B can cause car 318C to slide within reciprocal channel 328X toward the other end of rail 328, thus causing storage shelf 320 to rotate in a clockwise direction (labeled CW in FIG. 6) about the above-discussed central axis defined by the rod 324. PS 500 can be configured to control the extension and retraction of piston 318B via, for example, a hydraulic system, an electric motor, etc.

Referring to FIG. 4, a lever assembly 400 can include a T-shaped arm 410 (also called a lever, an input device, a control stick, etc.) pivotably mounted to trailing column assembly 200B with a pin 420 extending between a transverse bore (not labeled) defined through arm 410 and a pair of aligned apertures defined in flange 430. Processing system 500 can be configured to sense a rotational position of arm 410, which can be configured to sweep from the −90° angle (with respect to the longitudinal axis) shown in FIG. 4 to a maximum 60° position (not shown, but would dispose the outside end of arm 410 near holder 490). Arm 410 can thereby serve as a user input to processing system 500. While in any other position, arm 410 can be biased to the downward, −90° position shown in FIG. 4. As a result, arm 410 can return to the downward position whenever a user releases arm 410.

Processing system 500 can be configured to drive cart 10 (by actuating the motors and/or brakes connected to wheels 110) based on the rotational position (i.e., angle) of arm 410. As one example, processing system 500 can drive cart 10 at a speed based on the rotational position of arm 410, reflecting a desired speed of the user. Processing system 500 can determine that the user desires a maximum speed when arm 410 is at its maximum positive angle with respect to the longitudinal axis (60° in the example above) and determine that the user desires a speed of zero (i.e., stopping) when arm 410 is below 0°, 10°, 20°, or 30° with respect to the longitudinal axis.

Processing system 500 can be configured to enter a manual drive mode when detecting that arm 410 is above a threshold angle (e.g., 0, 10°, 20°, 30°, etc.) with respect to the longitudinal axis and be configured to enter an autonomous drive mode when detecting that arm 410 is below the threshold angle. Upon entering the manual drive mode, and according to some embodiments, the user can drive (e.g., control speed and direction of) cart 10 based on user inputs such as buttons (not shown) disposed on arm 410. According to some embodiments, processing system 500 can automatically present a driving interface on the display of mobile processing system component 500B upon detecting that the user has entered manual drive mode. The driving interface can display route, speed, remaining energy (e.g., battery life), etc. The driving interface can be configured to receive user inputs such that the user can control speed and/or direction of cart 10 through the driving interface.

Referring to FIG. 4, each transverse side of peripheral platform 322 can securely affix a longitudinally extending minor rail 332 defining a longitudinally extending slot 334. A plurality of lights 336 (i.e., illuminating elements) can be slideably retained within slot 334. Lights 336 can be battery powered and/or in wired electrical communication (not shown) with a cart battery.

Lights 336 can be in wired or wireless communication with processing system 500, which can be configured to individually energize each light 336, as further discussed below. Each rail 332 can hold a number of lights 336 equal to the number of containers 2 supported on a rack assembly 300. For example, if upper rack assembly 300, 300C held six containers 2, then each rail 332 of upper rack assembly 300C can include six lights for a total of twelve lights.

Each light 336 of a rail 332 can be longitudinally spaced to transversely align with one container 2. Accordingly, FIG. 4 shows the smaller upper container 2, 2C being transversely aligned with exactly two lights 336 (only one of these lights is shown, the other, being on the other side of cart 10, is not visible from the perspective of FIG. 4). In FIG. 4, larger lower container 2, 2A is transversely aligned with two lights 336 on a single rail 332 (lights 336A, 336B). Therefore, a user may eventually remove some lights 336 from lower rack assembly 300, 300A according to the method discussed below.

Prior to transporting customer-ordered items on cart 10, a user may place open and empty containers 2 on cart 10 (as used herein, the term "container" is intended to be representative of any box, bin, receptacle, etc. configured to store goods). Each container 2 can be the same or different size, be any shape (e.g., 3D rectangular, spherical, cylindrical, etc.) suitable for storing goods, and be made of any material (e.g., cardboard, metal, polymeric, etc.) suitable for storing goods. Each container 2 can be releasably secured (e.g., strapped, taped) to a peripheral platform 322 to discourage relative motion. In some embodiments, containers 2 can be cardboard shipping boxes as shown in FIG. 4.

Figure 3:
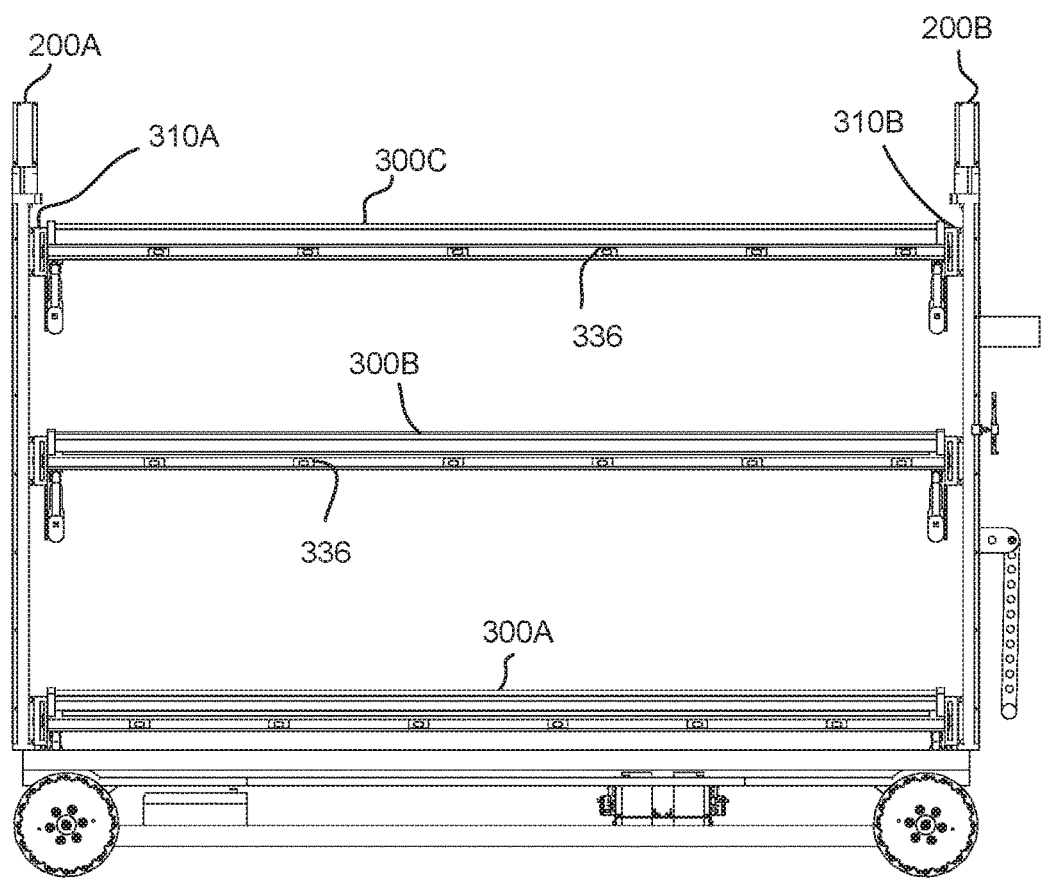
FIG. 3 is a side elevational view of the cart, in accordance with some embodiments.
Figure 3:
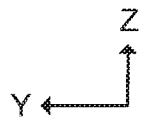
Figure 10A:
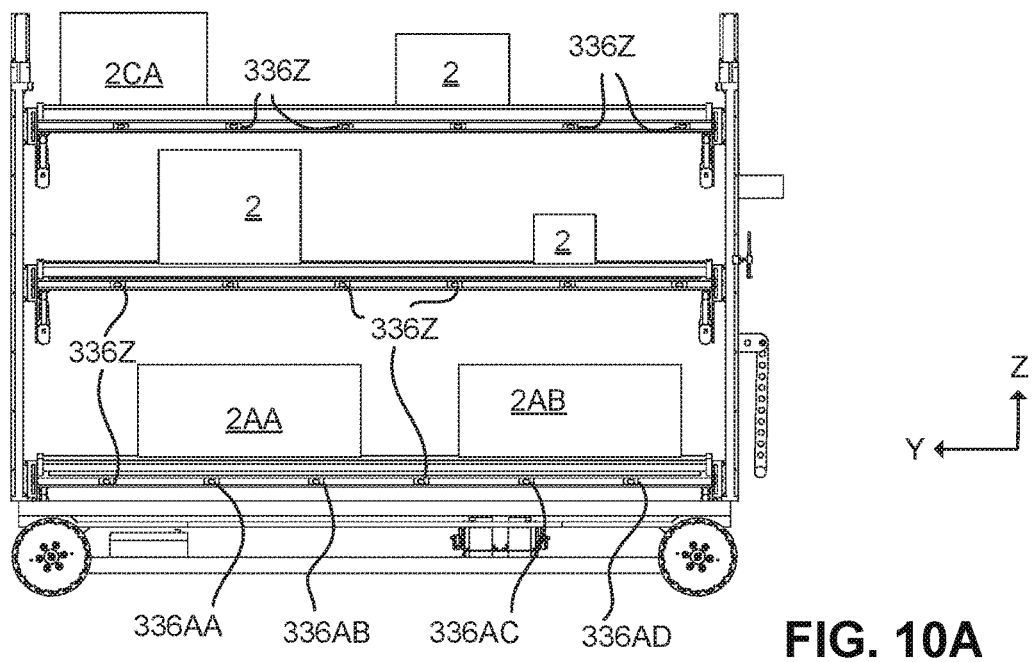
FIGS. 10A and 10B are side elevational views of the cart, in accordance with some embodiments.

FIG. 10A illustrates cart 10 from the same perspective as FIG. 3 after receiving containers 2 on rack assemblies 300. The other side of cart 10 can be a mirror image of FIG. 10A. With respect to lower rack assembly 300, 300A, lights 336AA, 336AB are transversely aligned with container 2AA (meaning that a total of four lights 336 are aligned with container 2AA after accounting for the hidden side of cart 10). The same is true with respect to container 2AB with lights 336AC and 336AD. Some lights 336Z are not transversely aligned with any containers.

Figure 10B:
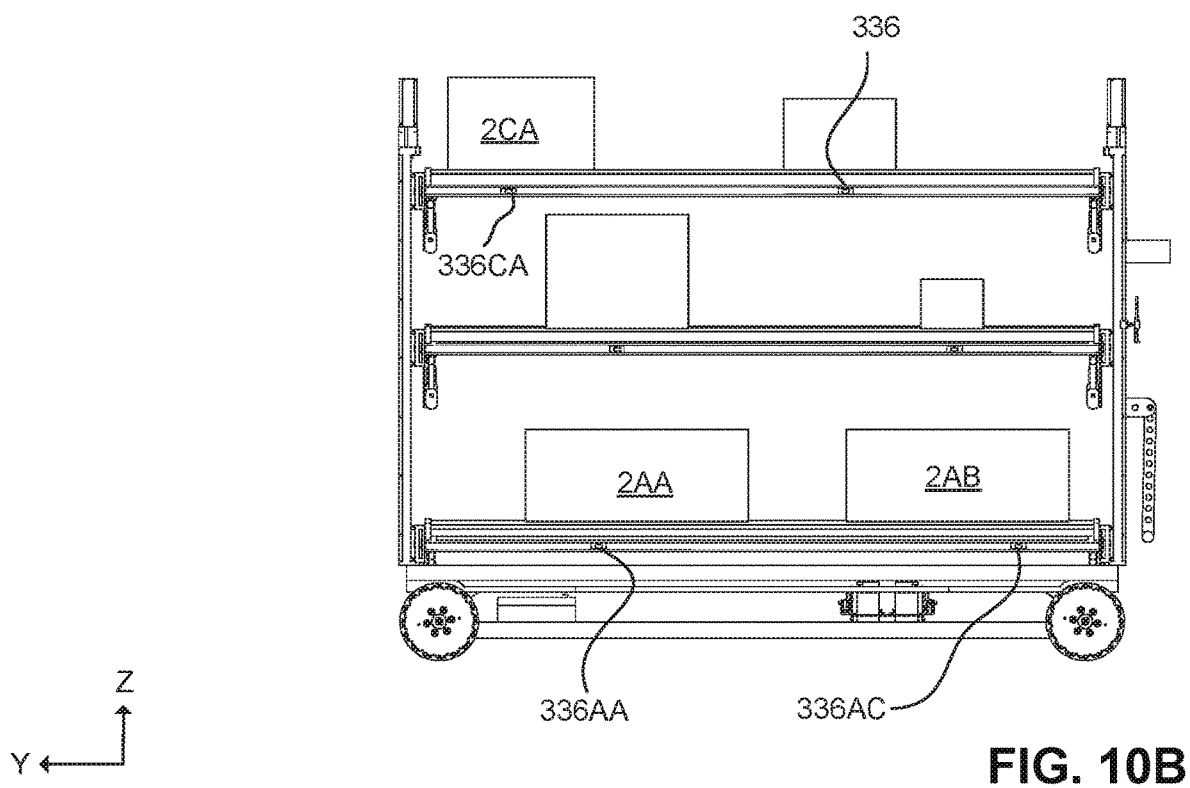

Accordingly, and as shown in FIG. 10B, a user may remove lights 336Z, one of lights 336AA, 336BB, and one of lights 336AC, 336AD such that each transverse side of cart 10 includes one transversely aligned light 336 per container 2. The user may remove unwanted lights 336 by sliding them through either longitudinal end (not labeled) of a rail 332. After obtaining the desired number of lights 336 per rail 332, the user may slide lights 336 until each is transversely aligned with a container 2. The user can perform the same activity on the other side of cart 10. Instead of subtracting and repositioning lights 336 as described above, the user may add and reposition lights 336 when starting, for example, with a cart 10 without any lights 336.

FIGS. 11A-12B schematically depict cart 10, user 20, and a plurality of shelves 30 inside a warehouse (i.e., a distribution center). Shelves 30 (i.e., shelving) can be storing thousands of goods, a few of which (referred to as target goods 50) user 20 wants to load into containers (not shown) disposed on cart 10. Items on shelving 30 other than target goods 50 are not shown. Target goods 50 can include any items capable of being stored, such as groceries, electronics, industrial equipment, etc. The stippling patterns used in these Figures are without underlying meaning and appear for the reader's convenience in distinguishing the various features.

When referring to FIGS. 11A-12B the terms transverse and longitudinal respectively refer to the X and Y axes of cart 10, which are static with respect to cart 10, but variable with respect to the warehouse environment. For example, in FIG. 11A the longitudinal axis of cart 10 is collinear with virtual path 70, 70A while in FIG. 11B, the longitudinal axis of cart 10 is collinear with virtual path 70, 70B. Cardinal directions North, South, East, and West indicate two-dimensional coordinates in the warehouse. The warehouse and cart 10 can share vertical axes.

Cart 10 (via processing system 500) can be configured to enter an autonomous operating mode. While in the autonomous operating mode, cart 10 can automatically switch between a driving state and an item receiving state. Whenever the present disclosure provides that cart 10 can perform a function, such a statement discloses that processing system 500 can be configured to automatically cause cart 10 to perform the function.

During the autonomous driving state, cart 10 can follow user 20 through the warehouse (subject to the optional features discussed below). Cart 10 can use a variety of known technologies to track the location of user 20 including, for example, sonar sensors, infrared sensors, LiDAR sensors, image sensors, beacon sensors (configured to triangulate a signal emanating, for example, from a beacon clipped to user 20), etc. During the autonomous driving state, cart 10 can be configured to maintain at least a minimum buffer dimension D1 from user 20, which can represent the minimum distance from cart 10 to user 20 within the warehouse coordinate system.

During the autonomous driving state, cart 10 can observe a maximum speed setting. The maximum speed setting (i.e., speed limit) can vary based on the total weight of cart 10 (the total weight includes the weight of goods). As the total weight of cart 10 increases, the maximum speed setting can decrease. Alternatively, or in addition, as the total weight of cart 10 increases, cart 10 can be configured to increase the minimum buffer distance D1 to provide extra braking room if, for example, the user halts. Put differently, as its total weight increases, cart 10 can be configured to drive slower and/or maintain a greater buffer distance D1, while as its total weight decreases, cart 10 can be configured to drive faster and/or maintain a lesser buffer distance D1.

During the autonomous driving state, cart 10 can be configured to route based on virtual paths 70, which, as shown, can through the aisles 60 defined between shelving units 30. When an event occurs conflicting with the autonomous driving state (e.g., an obstacle is in a virtual path 70, etc.), cart 10 can stop and request user correction via manual driving mode.

Figure 11A:
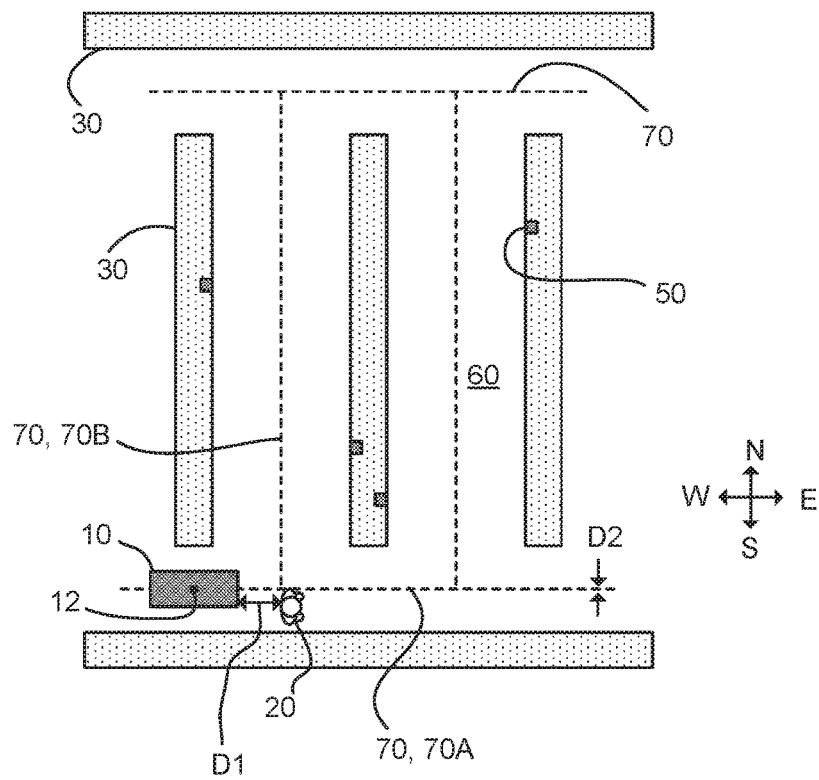
FIGS. 11A, 11B, 12A, and 12B are top plan schematic views of the cart operating in a warehouse, in accordance with some embodiments.

Referring to FIG. 11A, cart 10 can define a two-dimensional centroid 12 (also called a target region), which can be a point or a two-dimensional area and lie approximately at the two-dimensional center of cart 10. During the at confined operating mode, cart 10 can be configured (i.e., processing system 500 can be configured) to maintain centroid 12 within (from a two-dimensional perspective) virtual paths 70, each of which can define a constant or variable two-dimensional thickness D2.

When in the autonomous driving state, cart 10, even while following user 20, can avoid transverse motion (i.e., substantially unable to move in the transverse direction). Instead, cart 10 can be configured to limit its motion, while in the autonomous driving state, to (a) translating in the longitudinal direction with either leading column assembly 200a or trailing column assembly 200b (as desired) in the forward position and (b) performing a zero radius turn to align the longitudinal direction with a desired heading, as discussed below.

Figure 11B:
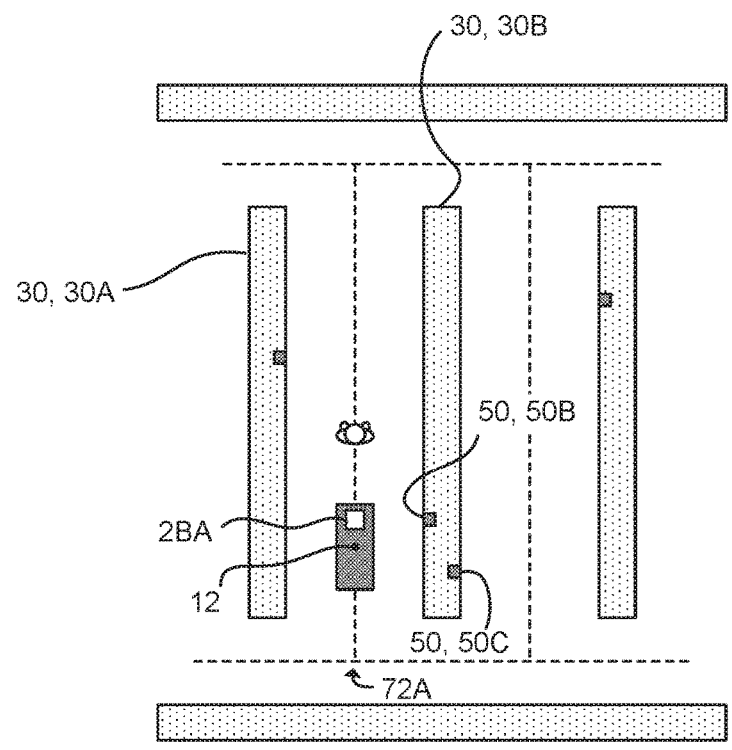
Figure 12A:
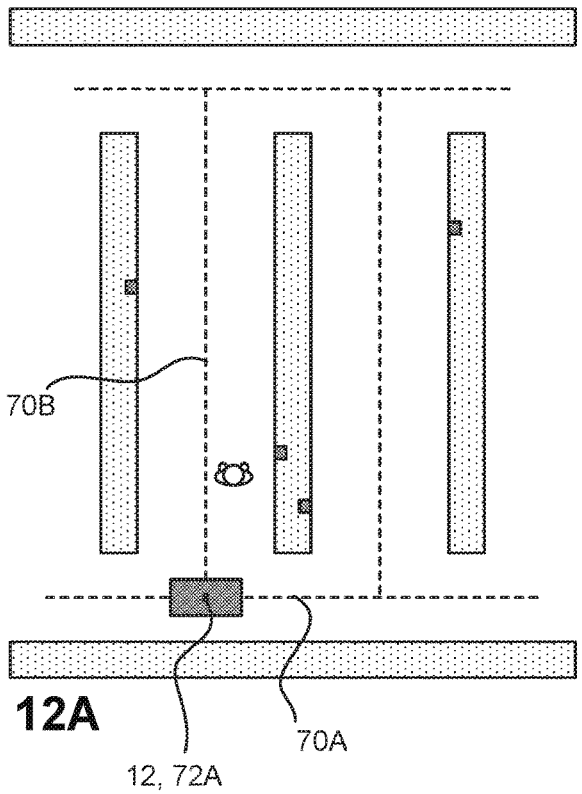
Figure 12B:
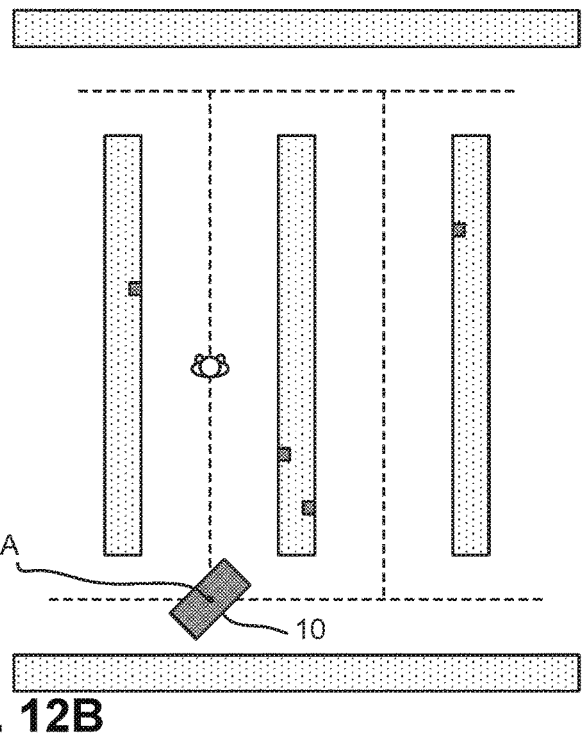

In the example of FIGS. 11A, 11B, 12A, and 12B, cart 10 can configured to translate along its −Y axis (i.e., with trailing column assembly 200, 200B in a forward position). Cart 10 can rely on the Mecanum wheels 110 to perform zero-radius turns to align its −Y axis with a desired heading. FIGS. 12A and 12B illustrate positions of cart 10 intermediate the moments shown in FIGS. 11A and 11B.

To perform a turn, and as shown in FIG. 12A, cart 10 can stop with centroid 12 at intersection 72A in FIG. 11B between virtual paths 70A and 70B. Cart 10 can then rely on Mecanum wheels 110 to perform a zero-radius turn such that centroid 12 remains within (from a two-dimensional perspective) path intersection 72A during the turn. FIG. 12B shows a moment in time when cart 10 is approximately halfway through its 90° rotation. Cart 10 can continue rotating until its longitudinal axis is aligned with virtual path 70B. Cart 10 can then translate along path 70B to the position shown in FIG. 11B.

Cart 10 can possess (i.e., have access to) a map with two dimensional (e.g., North and East) or three dimensional coordinates (North, East, and Vertical) of each target good 50 along with an order in which the target goods 50 should be picked for efficiency. Cart 10 can possess information about the dimensions of each target good 50 along with the dimensions of and/or location of each container 2.

During the autonomous driving state, cart 10 can monitor its position with respect to each target good 50. Upon determining that it will imminently pass an accessible target good 50, cart 10 can be configured to stop adjacent to the target good 50 and switch from the autonomous driving state to the autonomous item receiving state.

Cart 10 can stop such that the accessible target good 50 is transversely aligned with cart 10 or the target container 2 (i.e., the container 2 for holding the target good 50). Referring to FIG. 11B, target good 50B is transversely aligned with and accessible from cart 10. Although transversely aligned, target good 50B can be marked inaccessible for being on another side of shelving 30. Cart 10 has stopped such that container 2BA is transversely aligned with accessible target good 50B.

Cart 10 can be configured to remain parked and in the autonomous item receiving state until user 20 places the transversely aligned and accessible target good 50 on cart 10. Referring to FIG. 11B, cart 10 can remain parked until target good 50B is loaded into container 2BA, even if user 20 continues to walk down the aisle 60 and away from cart 10. According to other embodiments, cart 10 can automatically exit the autonomous item receiving state, even without receiving the target good 50, detecting a certain event (e.g., a distance between cart 10 and user 20 exceeding a predetermined threshold, etc.). Cart 10 can return to the autonomous driving state from the autonomous item receiving state.

Figure 13:
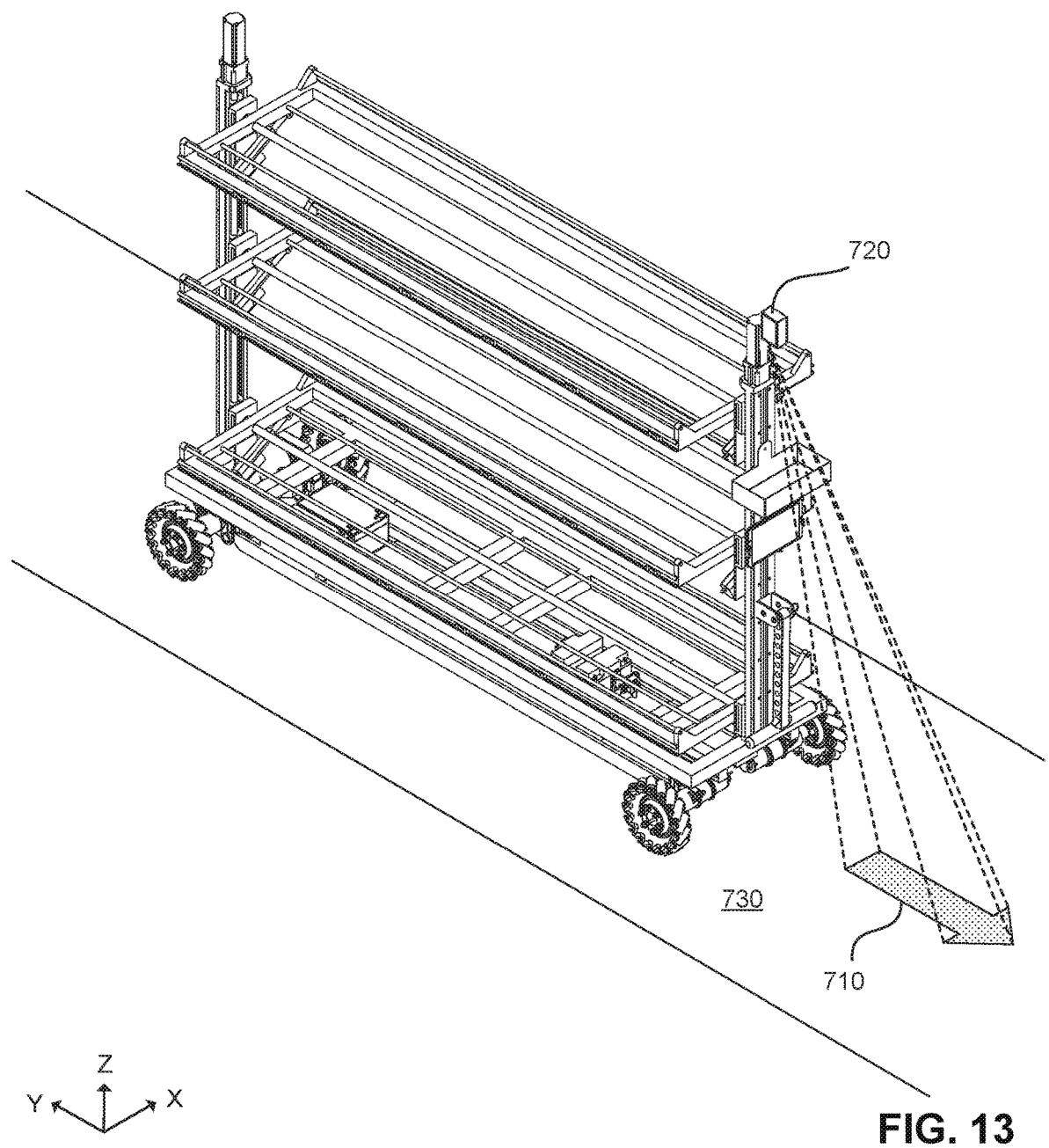
FIG. 13 is a front isometric view of the cart with a light projector casting a routing graphic onto the floor, in accordance with some embodiments.

Referring to FIG. 13, cart 10 can include a light projector 720 (i.e., a light source) configured to cast (i.e., beam, project) a routing graphic 710 on ground 730 (e.g., the floor of a warehouse). Routing graphic 710 (also called a heading graphic) can be any desired color (e.g., red, blue, green, orange, etc.). The beam cast by light projector can have an intensity such that route graphic 710 is visible and well-defined even when the ambient environment is well-lit. Besides a forward arrow as shown in FIG. 13, the light projector can be configured to embody routing graphic 710 as a left turn arrow, a right turn arrow, a U-turn arrow, an octagon (or another shape associated with braking) etc.

Cart 10 (i.e., the processing system 500 of cart 10) can be configured to cast routing graphic 710 during the autonomous driving state based on the upcoming route of cart 10. According to some embodiments, cart 10 can be configured to begin casting a new routing graphic 710 a predetermined amount of time before (and in some embodiments, simultaneous with) an acceleration/deceleration event. Cart 10 can maintain the casting of a current routing graphic 710 until an update becomes appropriate.

For example, while driving in the East direction of FIG. 11A toward intersection 72A, cart 10 can cast a forward arrow graphic 710 (FIG. 13) pointing in the longitudinal direction toward intersection 72A. Before/simultaneous with (e.g., a predetermined amount of time before such as three, two, one seconds) decelerating to stop centroid 12 on intersection 72A, cart 10 can cast an octagon graphic 710 (or another shape associated with braking such as a rectangle) preparing the user for cart deceleration.

Before/simultaneous with (e.g., the predetermined amount of time before) rotating to face the −Y axis toward North, cart 10 can cast a left turn arrow graphic 710 to indicate turning. Before/simultaneous with (e.g., the predetermined amount of time before) ending the turn, cart 10 can cast the above discussed braking graphic (e.g., an octagon). Before/simultaneous with (e.g., the predetermined amount of time before) accelerating North, cart 10 can cast the forward arrow graphic 710 point.

During the autonomous item receiving state (e.g., while parked adjacent a target good 50), cart 10 can be configured to cast routing graphic 710 to locate the target good 50 for the user. Referring to FIG. 11B, cart 10 can cast (i.e., project) a North-pointing forward arrow graphic 710 while traveling North away from intersection 72A. Before/simultaneous with (e.g., the predetermined amount of time before) decelerating to stop at target good 50, 50B, cart 10 can cast the braking graphic 710 (e.g., an octagon, a rectangle, etc.). Upon stopping (or in some cases, a the predetermined amount of time before stopping) and entering the autonomous item receiving state, cart 10 can cast a routing graphic 710 identifying a location of target good 50, 50B.

The graphic 710 can be, for example, the above-discussed left or right turn arrows and point toward the shelving 30 on which target good 50, 50B rests. In the example of FIG. 11B, cart 10 can cast a right turn arrow identifying second shelving 30, 30B (which is to the East of cart 10) as holding the target good 50. In some embodiments, cart 10 can be configured to locate a target good 50 by, for example, directly illuminating the target good with the light projector (e.g., shining the light projector directly on target good 50B).

Referring to FIGS. 3 and 10B, cart 10 (i.e., processing system 500 of cart 10) can map each container 2 to one or more corresponding lights 336. In the example of FIG. 10B, each container 2 can be correspond with two lights 336 (one on each transverse side of cart 10). Upon entering the item receiving state, cart 10 can illuminate each light 336 mapped to the target container 2 (i.e., the container 2 for the target good 50). If one light 336 is mapped to a container 2 per transverse side, then cart 10 can be configured to only activate the light 336 on the same transverse side as the target good 50. Referring to FIG. 10B, if a target good 50 is destined for container 2AA, then cart 10 can illuminate light 336AA and if the target good 50 is destined for container 2CA, then cart 10 can illuminate light 336CA.

Figure 14:
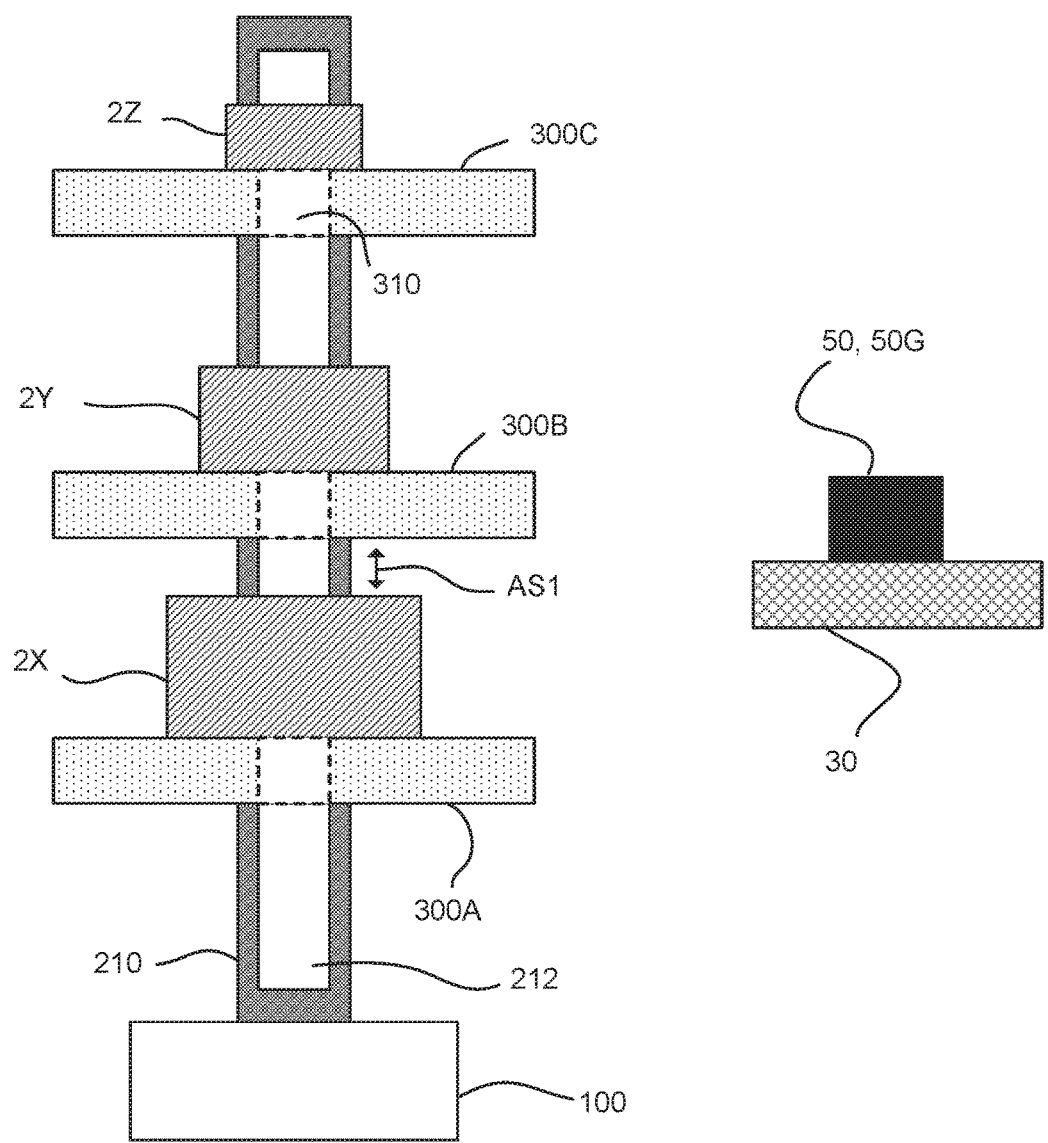
FIG. 14 is a front elevational schematic view of the cart, in accordance with some embodiments.

As previously discussed, cart 10 can be configured to rotate and vertically translate rack assemblies 300. FIG. 14 is a schematic front elevational view from the transverse and vertical plane (i.e., X-Z plane) longitudinally bisecting cart 10. FIG. 14 shows lower, middle, and upper rack assemblies 300, 300A, 300B, 300C respectively holding lower, middle, and upper containers 2, 2X, 2Y, 2Z. Column assembly 200A defines channel 212 in which hidden elevator cars 312 (accordingly shown in broken lines) can translate. Column assembly 200B is not shown for clarity. Independent of cart 10, a target good 50G is resting on shelving 30.

In the autonomous item receiving state (e.g., when cart 10 is parked adjacent to a target good 50), cart 10 can be configured to rotate and translate (i.e., reposition) rack assemblies 300 based on (a) dimensions of the target good 50, (b) dimensions of the target container 2, (c) location of the target good 50, with respect to the target container 2, and (d) an ergonomic preference of the user.

Cart 10 can use (a) dimensions of the target good 50 and (b) dimensions of the target container 2 to ensure that adequate space is defined between the target container 2 and an interfering rack assembly 300 (i.e., the rack assembly 300 located directly above container 2) for a user to deposit target good 50 in target container 2. To enhance the user experience, adequate access space can be set as more than the absolute minimum space necessary for a user to deposit target good 50 in target container 2.

Figure 15:
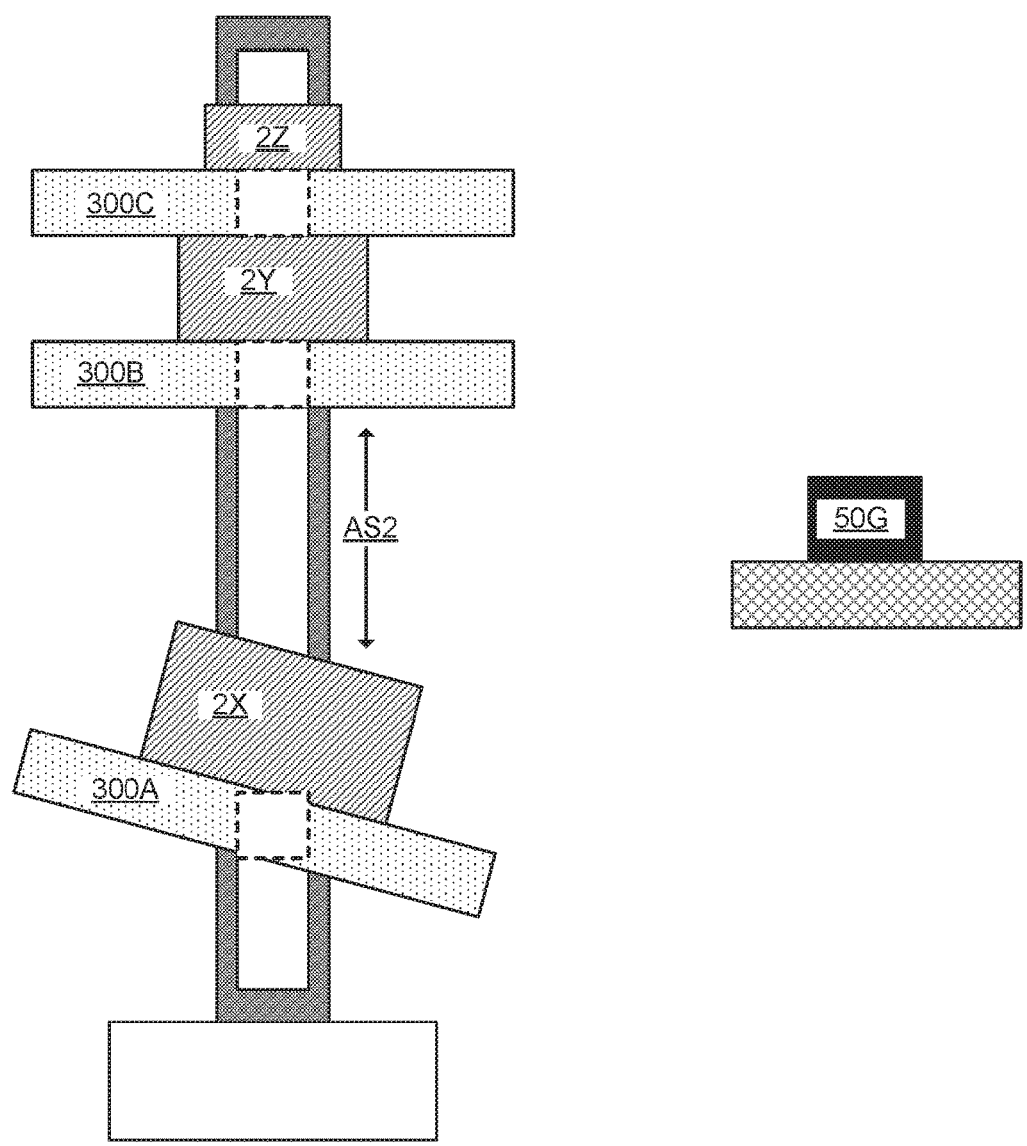
FIG. 15 is a front elevational schematic view of the cart, in accordance with some embodiments.

In FIG. 14, the access space AS1 defined between target lower container 2A and interfering middle rack assembly 300B is insufficient to accommodate target good 50G. To fully accommodate target good 50G, and as shown in FIG. 15, cart 10 can tilt lower rack assembly 300A toward the shelving 30, raise middle and upper rack assemblies 300B, 300C, and/or reduce the height of lower rack assembly 300A to increase the access space (marked AS2).

Figure 16:
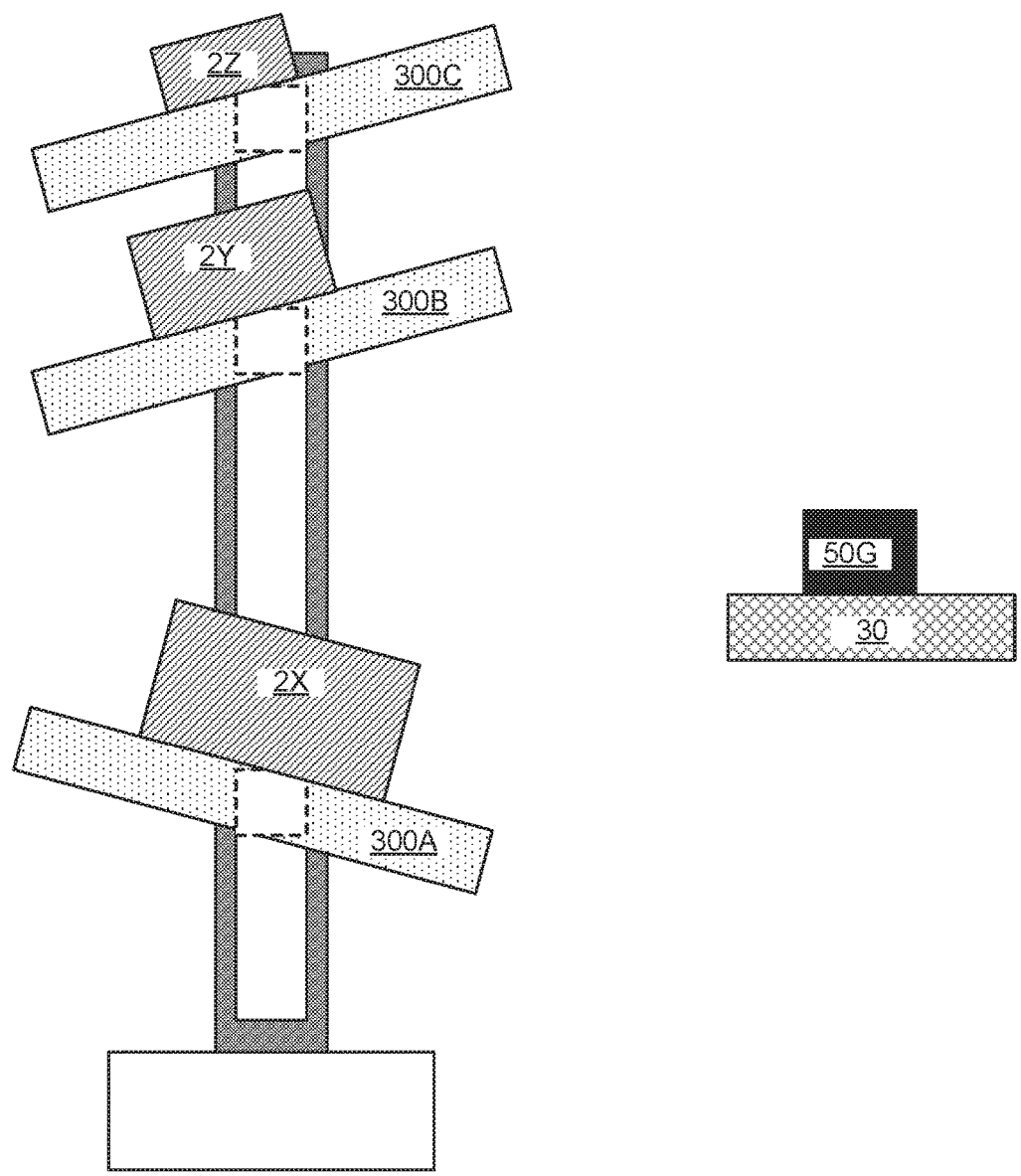
FIG. 16 is a front elevational schematic view of the cart, in accordance with some embodiments.

To define sufficient access space for larger items, cart 10 can be configured to tilt the target rack assembly 300 in a first direction, while tilting any interfering rack assemblies 300 in an opposing direction. Referring to FIG. 16, cart 10 tilted target lower rack assembly 300A toward target good 50G while tilting middle and upper rack assemblies 300B, 300C away from target good 50G to further expand dimension D3.

Cart 10 can automatically perform any repositioning disclosed herein. If there are multiple ways of creating adequate access space, cart 10 can further reposition rack assemblies 300 based on (c) the location of target good 50 with respect to target container 2 and/or (d) ergonomic preferences of the user. For example, cart 10 can keep the target rack assembly 300 lower than the target good 50 such that the user does not need to raise the target good 50. As another example, cart 10 can keep the target rack assembly 300 in an ergonomically pleasing position (e.g., from 1 to 1.5 m above ground, representing waist/chest level for the user).

After autonomously positioning rack assemblies 300, cart 10 can further reposition rack assemblies 300 in response to user-commands. In some instances cart 10 can receive (i.e., determine) the user-commands through the mobile processing system component 500B. Cart 10 can further include load sensors for detecting force/moment applied when the user touches a rack assembly 300 (e.g., an upward force, a downward force, a positive tilting moment, and/or a negative tilting moment).

Cart 10 can automatically reposition rack assemblies 300 consistent with the user applied force/moment (which would otherwise be insufficient to cause any rack assembly 300 to move). Cart 10 can (a) detect user applied force/moment, (b) determine what motion of the rack assemblies 300 is consistent with the user applied force/moment, then (c) reposition one or more rack assemblies 300 accordingly. For example, if cart 10 detects the user lightly pressing on the bottom of middle rack assembly 300, cart 10 can raise middle rack assembly 300. As another example, if cart 10 detects the user lightly pressing on a transverse end of the top of middle rack assembly 300, cart 10 can tilt middle rack assembly 300 consistent with the resulting moment.

Figure 17:
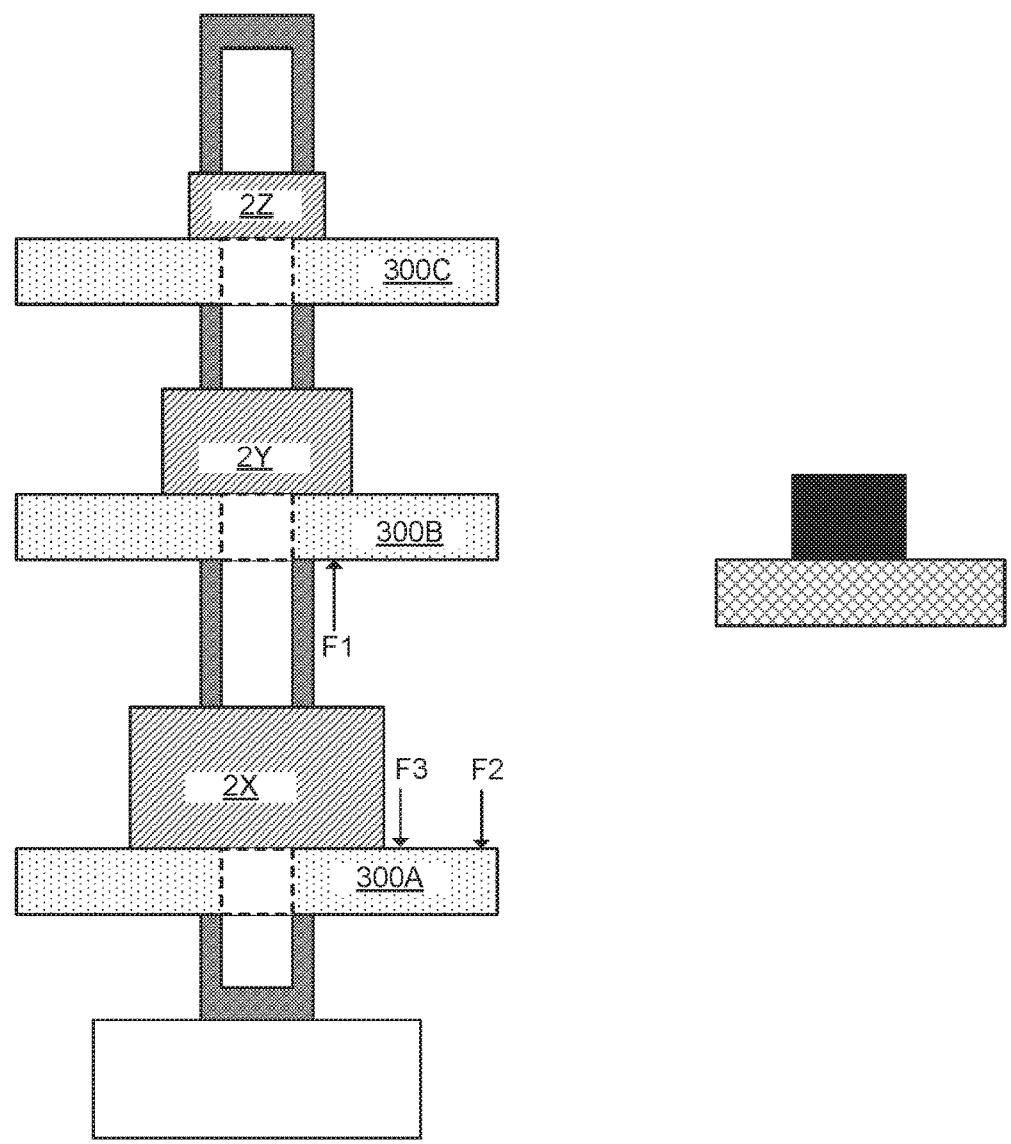
FIG. 17 is a front elevational schematic view of the cart, in accordance with some embodiments.

Referring to FIG. 17, cart 10 can upwardly translate middle rack assembly 300B in response to continuously applied light force F1 until middle container 2Y is within a predetermined distance (e.g., in contact with) upper rack assembly 300C. Then, cart 10 can either decline to further reposition or move both upper rack assembly 300C with middle rack assembly 300B until no longer detecting light force F1 or upper rack assembly 300C reaches a maximum height.

Referring to FIG. 17, cart 10 can be configured to tilt lower rack assembly 300A toward target good 50G and/or downwardly translate lower rack assembly 300 in response to applied light force F2. In some embodiments, cart 10 can be configured to treat forces applied in a first zone (e.g., toward the transverse middle of each rack assembly 300) as being directed to vertical translation and treat forces applied in second zones (e.g., at the transverse ends of each middle rack assembly 300) as being directed to tilting. Therefore, cart 10 can treat applied light force F2 as a tilting command (for being at a transverse end of lower rack assembly 300A) and treat light force F3 as a translation command (for being toward the transverse middle of lower rack assembly 300A).

Upon determining that a target good 50 has been successfully received in the target container 2 (e.g., via information received from an external processing system monitoring the user, from load sensors disposed in cart 10, etc.), cart 10 can transition from the item receiving operating state or mode to the user-following operating state or mode.

Figure 18:
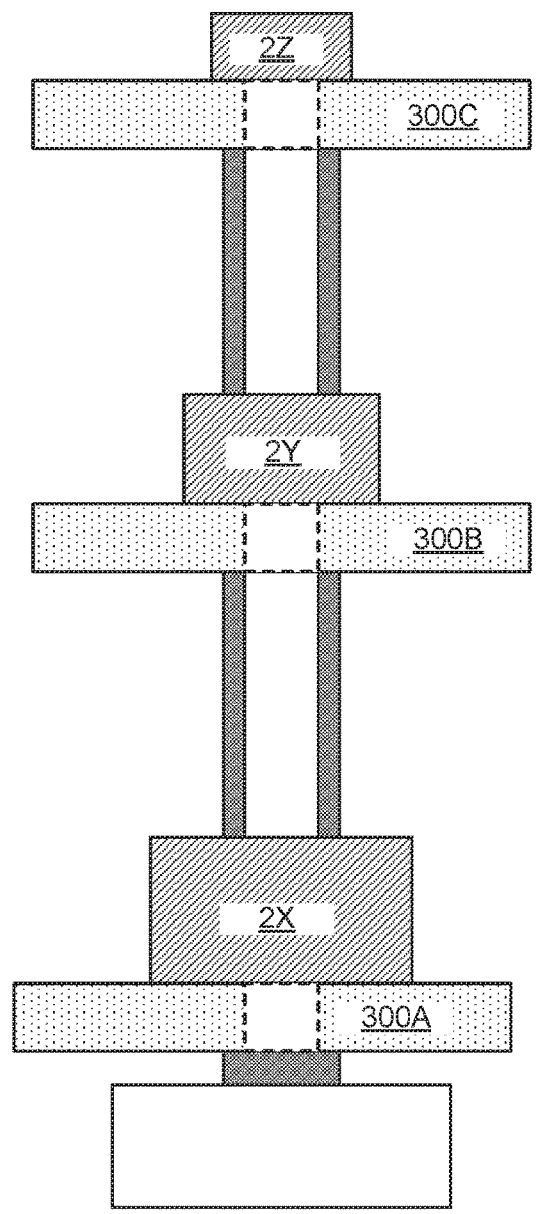
FIG. 18 is a front elevational schematic view of the cart, in accordance with some embodiments.

Cart 10 can be configured to enter an unloading operating state. The first stage (shown in FIG. 18) can be for unloading the middle rack assembly 300B. The second stage (FIG. 19) can be for unloading the lower rack assembly 300A. The third stage (FIG. 20) can be for unloading the upper rack assembly 300C.

In the first stage (FIG. 18), cart 10 can vertically translate upper rack assembly 300C to its maximum height and vertically translate lower rack assembly 300A to its minimum height. Cart 10 can vertically translate and/or tilt middle rack assembly 300B within the space defined between lower rack assembly 300A and upper rack assembly 300C to define sufficient unloading access space and accommodate any user ergonomic preferences. Cart 10 can further reposition rack assemblies 300 responsive to any user applied forces/moments as previously discussed.

Unloading access space can be defined by one or more dimensions reflecting the space available for a user to remove a container from cart 10. Unloading access space can be unlimited (in the case of upper rack assembly 300C) or limited (in the case of middle and lower rack assemblies 300A, 300B). Cart 10 can use (a) the dimensions of each container 2 on a target rack assembly 300 to ensure that adequate unloading access space is defined a target rack assembly 300 and an interfering rack assembly 300. To enhance user experience, adequate unloading access space can be set as more than the absolute minimum space necessary for a user to withdraw a container 2 from cart 10.

The user can remove middle containers 2Y from middle rack assembly 300B. The user can place the containers, for example, on a conveyer leading to a shipping center. As shown, cart 10 can maintain both lower and upper rack assemblies 300A, 300C in a ground-parallel (i.e., level) state.

Cart 10 can proceed to the second stage (FIG. 19) upon (i.e., based on) determining that middle rack assembly 300B is clear of middle containers 2Y (e.g., via corresponding weight sensors for middle rack assembly 300B). In the second stage, cart 10 can vertically translate middle rack assembly 300B to a position directly underneath upper rack assembly 300C (e.g., cart 10 can minimize the vertical space separating middle rack assembly 300B from upper rack assembly 300C to a minimum possible dimension, which can occur when upper rack assembly 300C contacts middle rack assembly 300B). Upper rack assembly 300C can remain at its maximum possible height.

Figure 19:
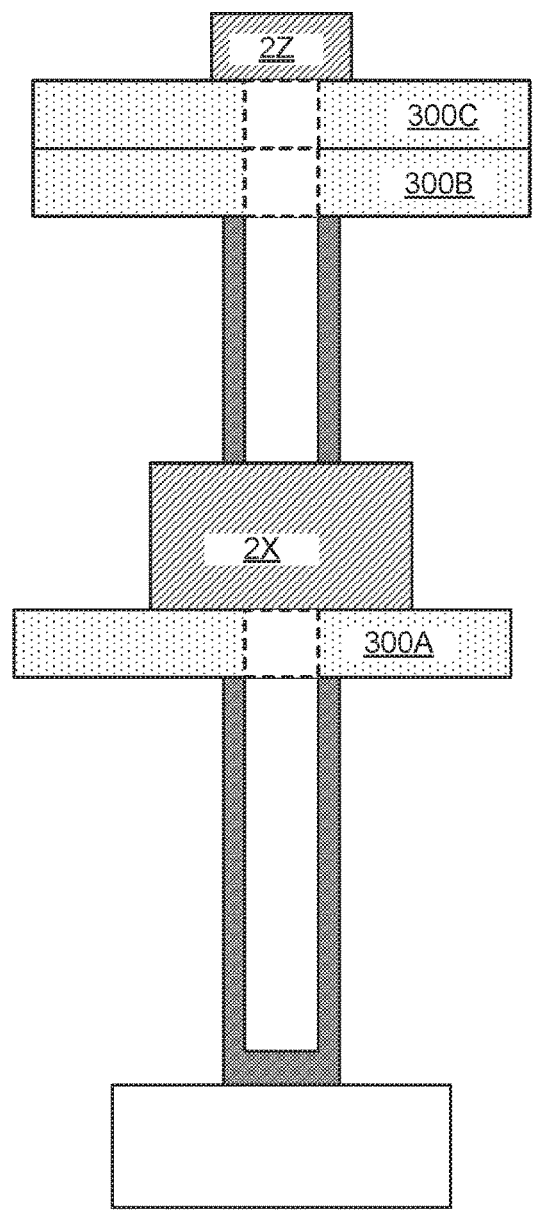
FIG. 19 is a front elevational schematic view of the cart, in accordance with some embodiments.
Figure 20:
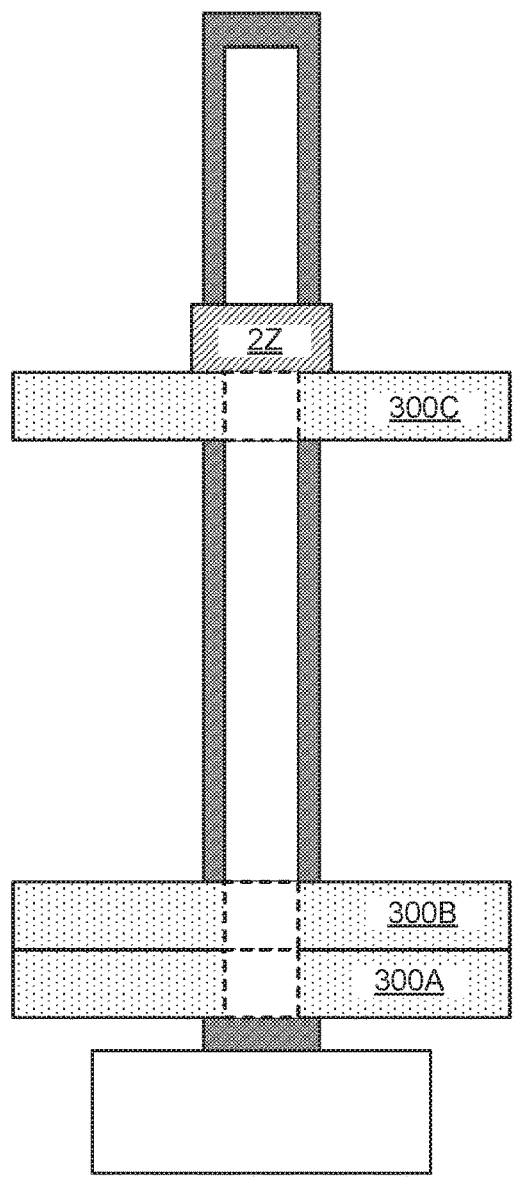
FIG. 20 is a front elevational schematic view of the cart, in accordance with some embodiments.

Cart 10 can vertically translate and/or tilt lower rack assembly 300A to define sufficient unloading access space and accommodate any user ergonomic preferences. FIG. 19 shows lower rack assembly 300A being elevated above its position in FIG. 18 to a user-desirable height (e.g., 1-1.5 m above ground). As shown, cart 10 can maintain both middle and upper rack assemblies 300B, 300C in a ground-parallel (i.e., level) states. Cart 10 can further reposition rack assemblies 300 responsive to any user applied forces/moments as previously discussed. The user can unload any lower containers 2X.

Cart 10 can proceed to the third stage (FIG. 20) upon determining that lower rack assembly 300A is clear of lower containers 2X. Cart 10 can downwardly translate lower rack assembly 300A to a lowest possible height. Cart 10 can lower middle rack assembly 300B to a position directly above lower rack assembly 300A (e.g., cart 10 can minimize the vertical space separating middle rack assembly 300B from lower rack assembly 300A to a minimum possible dimension, which can occur when lower rack assembly 300A contacts middle rack assembly 300B).

As shown, cart 10 can maintain both lower and middle rack assemblies 300A, 300B in a ground-parallel (i.e., level) state. Cart 10 can lower and/or tilt upper rack assembly 300C based on user ergonomic preferences. Cart 10 can further reposition rack assemblies 300 responsive to any user applied forces/moments as previously discussed. The user can unload any upper containers 2Z.

Figure 21:
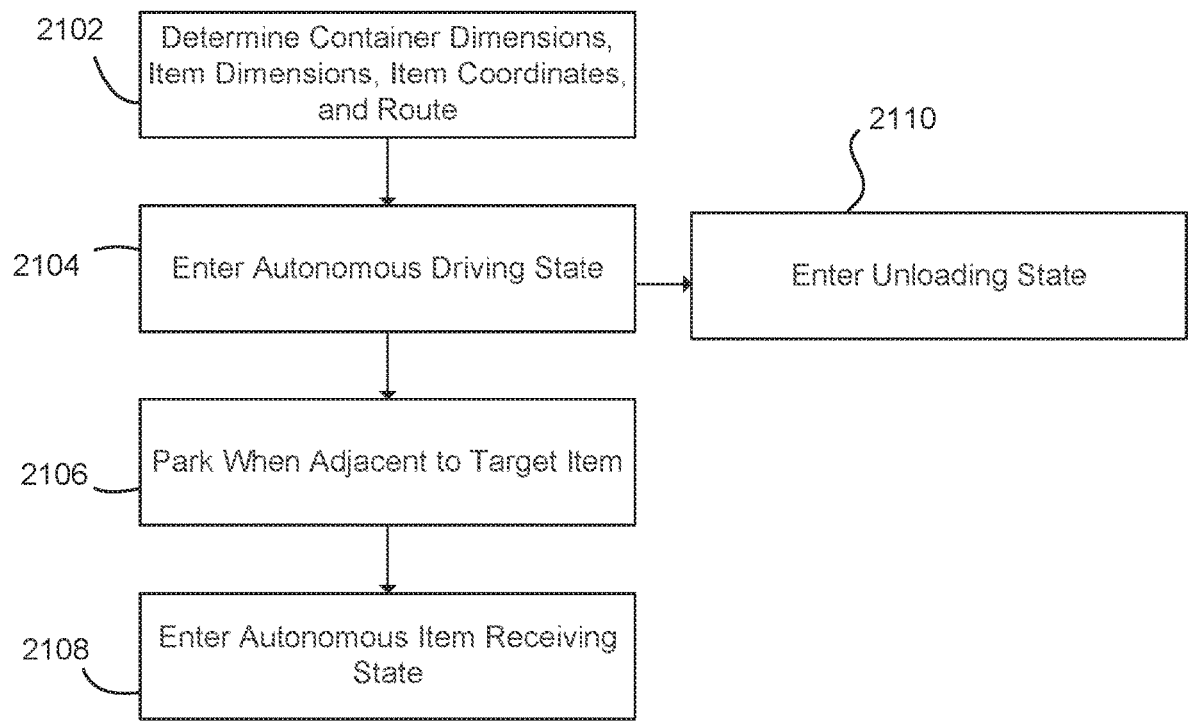
FIG. 21 is a block diagram of a method of operating the cart, in accordance with some embodiments.

FIG. 21 presents a method of using cart 10. Processing system 500 can be configured to perform (e.g., automatically perform) any of the operations discussed in the present application, including the operations discussed with reference to FIG. 21.

Referring to FIG. 21, and at block 2102, processing system 500 can determine (e.g., receive, sense, compute, etc.) a user identity, a warehouse coordinate system, a list of target goods 50 including their warehouse coordinates and dimensions (e.g., length, width, height, and weight), a list pairing each target good 50 with a container 2, the location of each container 2 on cart 10 (e.g., which rack assembly 300 a container 2 is disposed on), a list pairing each light 336 with a container 2, and a route for retrieving target goods 50.

At block 2104, processing system 500 can enter an autonomous driving state where processing system 500 can (a) follow the user through the warehouse while (b) maintaining a predetermined buffer dimension with respect to the user (and any other obstacles), and (c) confining target region 12 (also called a centroid) to virtual paths 70.

During the autonomous driving state, processing system 500 can be configured to drive cart 10 within virtual paths 70 by (a) translating along its Y-axis and (b) performing a zero-radius turn to align its Y-axis with a desired heading. Processing system 500 can be configured to only translate cart 10 towards one of its longitudinal ends (e.g., toward trailing column assembly 200B). Therefore, processing system 500 can be configured to perform a 180° zero-radius turn to reverse directions. During the autonomous driving state, processing system 500 can project routing graphics 710 on the floor based on the current and/or upcoming direction of travel.

Processing system 500 can monitor the position of cart 10 in the warehouse with respect to target goods 50. At block 2106, processing system 500 can park cart 10 based on cart 10 being transversely aligned with an accessible target good 50 (e.g., based the target container 2 being transversely aligned with the target good 50). Processing system 500 can now switch from the driving state to the item receiving state.

During the item receiving state, and at block 2108, processing system 500 can project a routing graphic 710 identifying a location of the accessible target good 50 (e.g., an arrow pointing to the shelving 30 storing the target good 50, a spotlight directly illuminating the target good 50, etc.). Processing system 500 can activate lights 336 associated with the target container 2. During the item receiving state, processing system 500 can automatically reposition rack assemblies 300 based on (i.e., based on at least in part) (a) dimensions of the target good 50, (b) dimensions of the target container 2, (c) location of the target good 50, with respect to the target container 2, and (d) an ergonomic preference of the user. Processing system 500 can further reposition rack assemblies 300 responsive to user-inputs. After block 2108, processing system 500 can return to the autonomous driving state (block 2104).

At block 2110, processing system 500 can enter the unloading state from the autonomous driving state. In the unloading state, processing system 500 can proceed through stage 1 (where the middle rack assembly 300B is unloaded), stage 2 (where the lower rack assembly 300A is unloaded), and stage 3 (where the upper rack assembly 300C is unloaded). During each unloading stage, processing system 500 can automatically reposition rack assemblies to create sufficient unloading access space.

Figure 22:
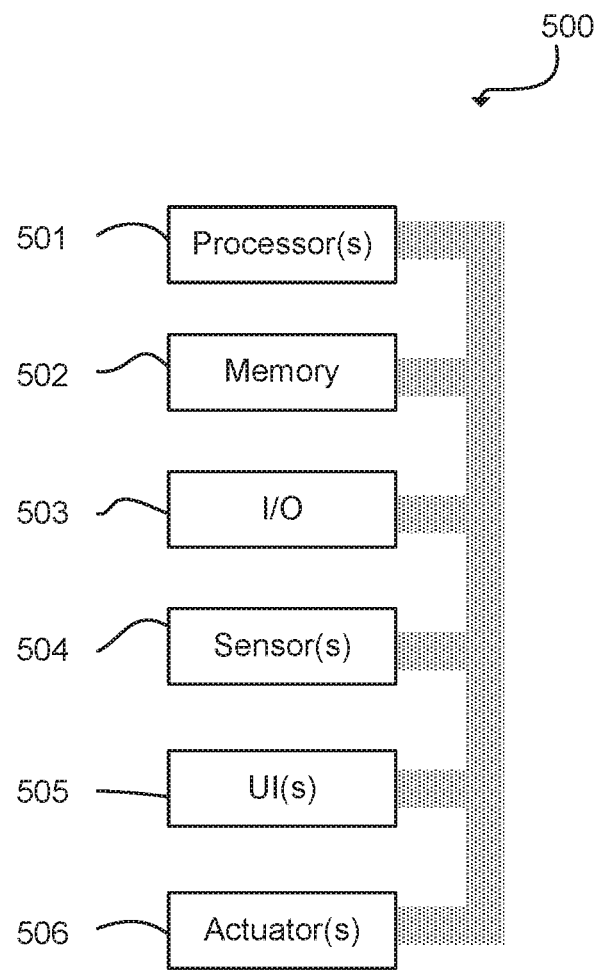
FIG. 22 is a block diagram of a processing system for controlling the cart, in accordance with some embodiments.

Processing system 500 is schematically shown in FIG. 22. As previously discussed with reference to FIG. 1, processing system 500 can distributed amongst, for example, a static component 500A and a mobile component 500B. Processing system 500 can include one or more processors 501, memory 502, one or more input/output devices 503, one or more sensors 504, one or more user interfaces 505, and one or more actuators 506.

Processors 501 can include one or more distinct processors, each having one or more cores. Each of the distinct processors can have the same or different structure. Processors 501 can include one or more central processing units (CPUs), one or more graphics processing units (GPUs), circuitry (e.g., application specific integrated circuits (ASICs)), digital signal processors (DSPs), and the like. Processors 501 can be mounted on a common substrate or to different substrates.

Processors 501 are configured to perform a certain function, method, or operation at least when one of the one or more of the distinct processors is capable of executing code, stored on memory 502 embodying the function, method, or operation. Processors 501 can be configured to perform any and all functions, methods, and operations disclosed herein.

For example, when the present disclosure states that processing 500 performs/can perform task "X" (e.g., task "X is performed"), such a statement should be understood to disclose that processing system 500 can be configured to perform task "X". Cart 10 and processing system 500 are configured to perform a function, method, or operation at least when processors 501 are configured to do the same. Therefore, when the present disclosure provides that cart 10 performs a function, can perform a function, etc., such a statement means that processing system 500 can be configured to automatically cause cart 10 to perform the function. As used herein the term "determine", when used in conjunction with processing system 500 can mean detecting, receiving, looking-up, computing, and the like.

Memory 502 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 502 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 502.

Input-output devices 503 can include any component for trafficking data such as ports, antennas (i.e., transceivers), printed conductive paths, and the like. Input-output devices 503 can enable wired communication via USB®, DisplayPort®, HDMI®, Ethernet, and the like. Input-output devices 503 can enable electronic, optical, magnetic, and holographic, communication with suitable memory 503. Input-output devices can enable wireless communication via WiFi®, Bluetooth®, cellular (e.g., LTE®, CDMA®, GSM®, WiMax®, NFU)), GPS, and the like. Input-output devices 503 can include wired and/or wireless communication pathways.

Sensors 504 can capture physical measurements of environment and report the same to processors 501. Examples of sensors 504 include load sensors, image sensors, LiDAR sensors, etc. User interface 505 can include a display (e.g., LED touchscreens (e.g., OLED touchscreens), physical buttons, speakers, microphones, keyboards, and the like. Actuators 506 can enable processors 501 to control mechanical forces. Actuators 506 can include motors, hydraulics, etc. for driving cart 10, vertically translating rack assemblies 300, braking rack assemblies 300, tilting rack assemblies 300, etc.

Processing system 500 can be distributed among several components (e.g., static component 500A and mobile component 500B). Processing system 500 can have a modular design where certain modules have a plurality of the features shown in FIG. 3. For example, one module can include one or more processors 501, memory 502, I/O 503, and sensors 504.

We claim:

1. A vehicle comprising:
   a base assembly comprising a platform, a plurality of wheels and a motor for driving at least one of the plurality of wheels;
   a rack assembly comprising a storage shelf connected to the base assembly through a coupling, which comprises a bearing assembly enabling the storage shelf to rotate with respect to the platform; and
   a processing system configured to communicatively couple with the rack assembly, the processing system comprising one or more processors configured to:
   determine a location of a target good;
   cause the storage shelf to move based on the determined location.

2. The vehicle of claim 1 wherein said bearing assembly comprises an inner race, an outer race, and a plurality of roller elements disposed between the inner race and the outer race.

3. The vehicle of claim 2 wherein said rack assembly further comprises an elevator configured to vertically translate with respect to the platform.

4. The vehicle of claim 3 wherein said rack assembly further comprises an actuator configured to rotate the storage shelf with respect to the platform.

5. The vehicle of claim 4 wherein said actuator comprises a piston.

6. The vehicle of claim 1 further comprising:
   an illumination assembly coupled to the platform and comprising a light projector configured to illuminate a floor on which the vehicle drives; and
   wherein the processing system is configured to communicatively couple with the illumination assembly and to:
   determine at least one route for the vehicle;
   instruct the light projector to produce and cast a graphic with a shape reflecting the determined vehicle route.

7. The vehicle of claim 6 wherein the processing system is further configured to:
   determine a location of a target good;
   cause the light projector to cast a graphic identifying the determined item location.

8. The vehicle of claim 1 further comprising:
   a rail assembly comprising a beam defining a groove, the beam being affixed to the base assembly;
   wherein the rack assembly comprises a storage shelf joined with an elevator coupling, the elevator coupling being configured to translate within the groove and comprising a bearing assembly enabling the storage shelf to rotate with respect to the platform.

9. The vehicle of claim 1 wherein the base assembly is configured to perform a zero radius 360° turn.

10. The vehicle of claim 1 wherein the base assembly is configured to move in a plurality of directions without turning.

11. The vehicle of claim 1 wherein each wheel of the plurality of wheels comprises a Mecanum wheel.

12. A vehicle comprising:
    a base assembly comprising a platform, a plurality of wheels and a motor for driving at least one of the plurality of wheels;
    a rack assembly comprising a storage shelf connected to the base assembly through a coupling assembly, the coupling assembly comprising a bearing assembly enabling the storage shelf to rotate with respect to the platform; and a processing system configured to communicatively couple with the rack assembly, the processing system comprising one or more processors configured to:
  determine at least one dimension of an item to be loaded onto the storage shelf;
  cause the storage shelf to move based on the at least one determined dimension.

13. The vehicle of claim 12 further comprising:
an illumination assembly coupled to the platform and comprising a light projector configured to illuminate a floor on which the vehicle drives; and
wherein the processing system is configured to communicatively couple with the illumination assembly and to:
  determine at least one route for the vehicle;
  instruct the light projector to produce and cast a graphic with a shape reflecting the determined vehicle route.

14. The vehicle of claim 13 wherein the processing system is further configured to:
  determine a location of a target good;
  cause the light projector to cast a graphic identifying the determined item location.

15. The vehicle of claim 14 further comprising:
a rail assembly comprising a beam defining a groove, the beam being affixed to the base assembly;
wherein the rack assembly comprises a storage shelf joined with an elevator coupling, the elevator coupling being configured to translate within the groove and comprising a bearing assembly enabling the storage shelf to rotate with respect to the platform.

16. The vehicle of claim 12 wherein said rack assembly further comprises:
an elevator configured to vertically translate with respect to the platform; and
an actuator configured to rotate the storage shelf with respect to the platform.

17. A vehicle comprising:
a base assembly comprising a platform, a plurality of wheels and a motor for driving at least one of the plurality of wheels;
a rack assembly comprising a storage shelf connected to the base assembly through a coupling assembly, the coupling assembly comprising a bearing assembly enabling the storage shelf to rotate with respect to the platform; and
a processing system configured to communicatively couple with the rack assembly, the processing system comprising one or more processors configured to:
  determine a location of a user;
  determine at least one dimension of an item to be loaded onto the storage shelf; and
  cause the storage shelf to rotate within the bearing assembly toward the determined user location at an angle based on the at least one determined item dimension.

18. The vehicle of claim 17 further comprising:
an illumination assembly coupled to the platform and comprising a light projector configured to illuminate a floor on which the vehicle drives; and
wherein the processing system is configured to communicatively couple with the illumination assembly and to:
  determine at least one route for the vehicle;
  instruct the light projector to produce and cast a graphic with a shape reflecting the determined vehicle route.

19. The vehicle of claim 18 wherein the processing system is further configured to:
  determine a location of a target good;
  cause the light projector to cast a graphic identifying the determined item location.

20. The vehicle of claim 17 further comprising:
a rail assembly comprising a beam defining a groove, the beam being affixed to the base assembly;
wherein the rack assembly comprises a storage shelf joined with an elevator coupling, the elevator coupling being configured to translate within the groove and comprising a bearing assembly enabling the storage shelf to rotate with respect to the platform.

* * * * *